(12) United States Patent
Tidwell et al.

(10) Patent No.: US 7,882,176 B2
(45) Date of Patent: Feb. 1, 2011

(54) ESTABLISHING A MULTIPARTY SESSION BY SENDING INVITATIONS IN PARALLEL

(75) Inventors: Paul D. Tidwell, Sammamish, WA (US); Timothy M. Moore, Bellevue, WA (US); Dong Xiang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/140,472

(22) Filed: May 27, 2005

(65) Prior Publication Data

US 2006/0268753 A1  Nov. 30, 2006

(51) Int. Cl.
*G06F 15/16* (2006.01)

(52) U.S. Cl. ........................................ 709/204; 709/227

(58) Field of Classification Search ................. 709/204, 709/206
See application file for complete search history.

(56) References Cited

U.S. PATENT DOCUMENTS

| | | | |
|---|---|---|---|
| 4,768,190 A | 8/1988 | Giancarlo | |
| 5,422,883 A | 6/1995 | Hauris et al. | |
| 5,634,011 A * | 5/1997 | Auerbach et al. | ........... 709/242 |
| 5,699,523 A | 12/1997 | Li et al. | |
| 5,768,538 A * | 6/1998 | Badovinatz et al. | ......... 709/248 |
| 6,157,401 A | 12/2000 | Wiryaman | |
| 6,173,314 B1 | 1/2001 | Kurashima et al. | |
| 6,288,739 B1 | 9/2001 | Hales et al. | |
| 6,336,135 B1 * | 1/2002 | Niblett et al. | ................ 709/215 |
| 6,404,745 B1 | 6/2002 | O'Neil et al. | |
| 6,477,150 B1 | 11/2002 | Maggenti et al. | |
| 6,687,358 B1 | 2/2004 | Mark et al. | |
| 6,801,610 B1 | 10/2004 | Malik | |
| 6,937,597 B1 * | 8/2005 | Rosenberg et al. | ........... 370/356 |
| 7,000,019 B2 * | 2/2006 | Low et al. | .................... 709/227 |
| 7,120,141 B2 * | 10/2006 | Kikinis | ........................ 370/352 |
| 7,317,695 B2 | 1/2008 | Mayer et al. | |
| 7,328,240 B2 | 2/2008 | El-Gebaly et al. | |
| 7,346,027 B2 | 3/2008 | Bossoli et al. | |
| 7,412,521 B2 * | 8/2008 | Olson et al. | .................. 709/227 |
| 7,509,425 B1 * | 3/2009 | Rosenberg | ................... 709/227 |
| 7,660,850 B2 | 2/2010 | Tidwell et al. | |

(Continued)

OTHER PUBLICATIONS

I. Miladinovic and J. Stadler, Multiparty Conferencing Signalling using the Session Initiation Protocol (SIP), Proceedings of the Inc 2002; pp. 191-198; Jul. 2002.*

(Continued)

*Primary Examiner*—Saleh Najjar
*Assistant Examiner*—Robert Shaw
(74) *Attorney, Agent, or Firm*—Perkins Coie LLP

(57) ABSTRACT

A method and system for establishing a multiparty session with a mesh configuration by sending out invitations to endpoints in parallel is provided. To initiate a session, an initiating endpoint sends invitations in parallel to the endpoints that are to be in the session. When the initiating endpoint receives an acceptance, it then sends to the accepting endpoint an indication of the other endpoints that are currently in the session. When an accepting endpoint receives the indication of the endpoints in the session, the accepting endpoint sends an invitation to establish a dialog to each of the indicated endpoints. When an endpoint that is in the session receives such an invitation, it can automatically accept the invitation because it is already participating in the session.

13 Claims, 23 Drawing Sheets

U.S. PATENT DOCUMENTS

| | | | |
|---|---|---|---|
| 2001/0049717 A1* | 12/2001 | Freeman et al. | 709/203 |
| 2002/0042693 A1* | 4/2002 | Kampe et al. | 702/186 |
| 2002/0116460 A1* | 8/2002 | Treister et al. | 709/204 |
| 2002/0126201 A1 | 9/2002 | Schmitt et al. | |
| 2002/0138569 A1 | 9/2002 | Slutsman et al. | |
| 2003/0008674 A1* | 1/2003 | Cudak et al. | 455/466 |
| 2003/0108002 A1* | 6/2003 | Chaney et al. | 370/261 |
| 2003/0145054 A1 | 7/2003 | Dyke | |
| 2003/0167302 A1* | 9/2003 | Zhu et al. | 709/204 |
| 2003/0204509 A1 | 10/2003 | Dinker et al. | |
| 2003/0215067 A1 | 11/2003 | Ordille et al. | |
| 2004/0047437 A1 | 3/2004 | Hamiti et al. | |
| 2004/0071099 A1* | 4/2004 | Costa-Requena et al. | 370/260 |
| 2004/0122896 A1 | 6/2004 | Gourraud | |
| 2004/0125802 A1 | 7/2004 | Lillie et al. | |
| 2004/0133683 A1* | 7/2004 | Keller et al. | 709/227 |
| 2004/0202303 A1* | 10/2004 | Costa-Requena et al. | 379/205.01 |
| 2004/0205190 A1* | 10/2004 | Chong et al. | 709/225 |
| 2004/0215787 A1 | 10/2004 | Gibson et al. | |
| 2004/0221010 A1 | 11/2004 | Butler | |
| 2005/0015495 A1 | 1/2005 | Florkey et al. | |
| 2005/0018659 A1 | 1/2005 | Gallant et al. | |
| 2005/0034079 A1* | 2/2005 | Gunasekar et al. | 715/753 |
| 2005/0058125 A1* | 3/2005 | Mutikainen et al. | 370/354 |
| 2005/0066038 A1 | 3/2005 | Sakamoto et al. | |
| 2005/0083941 A1* | 4/2005 | Florkey et al. | 370/395.2 |
| 2005/0125543 A1 | 6/2005 | Park et al. | |
| 2005/0132154 A1* | 6/2005 | Rao et al. | 711/162 |
| 2005/0141484 A1 | 6/2005 | Rasanen | |
| 2005/0160143 A1* | 7/2005 | Bae et al. | 709/205 |
| 2005/0160306 A1* | 7/2005 | Okunseinde et al. | 714/3 |
| 2005/0165934 A1* | 7/2005 | Rosenberg et al. | 709/227 |
| 2005/0181824 A1* | 8/2005 | Lloyd | 455/553.1 |
| 2005/0281208 A1 | 12/2005 | Dorenbosch et al. | |
| 2006/0002327 A1 | 1/2006 | Kallio et al. | |
| 2006/0018272 A1* | 1/2006 | Mutikainen et al. | 370/328 |
| 2006/0031292 A1* | 2/2006 | Deshpande | 709/204 |
| 2006/0053225 A1* | 3/2006 | Poikselka et al. | 709/227 |
| 2006/0067250 A1 | 3/2006 | Boyer et al. | |
| 2006/0072523 A1 | 4/2006 | Richardson et al. | |
| 2006/0079260 A1* | 4/2006 | Tillet et al. | 455/518 |
| 2006/0083244 A1* | 4/2006 | Jagadesan et al. | 370/395.2 |
| 2006/0095501 A1* | 5/2006 | Mochida | 709/203 |
| 2006/0095522 A1 | 5/2006 | Rang et al. | |
| 2006/0098607 A1* | 5/2006 | Zeng et al. | 370/338 |
| 2006/0114846 A1* | 6/2006 | Dssouli et al. | 370/261 |
| 2006/0161620 A1* | 7/2006 | Ganesan et al. | 709/204 |
| 2006/0271626 A1 | 11/2006 | Tidwell et al. | |
| 2008/0086564 A1* | 4/2008 | Putman et al. | 709/227 |
| 2008/0288643 A1* | 11/2008 | Suotula et al. | 709/227 |

OTHER PUBLICATIONS

P. Koskelainen, H. Schulzrinne, and X. Wu, A SIP-based conference control framework, Proceedings of the 12th international workshop on Network and operating systems support for digital audio and video, ACM pp. 53-61 (2002) ISBN:1-58113-512-2.*

K Singh, G Nair,and H Schulzrinne. Centralized conferencing using SIP, Internet Telephony Workshop, 2001.*

Hechmi Khlifi, Anjali Agarwal, Jean-Charles Gregoire, A Framework to Use SIP in AD-HOC Networks, Electrical and Computer Engineering, 2003. IEEE CCECE 2003. Publication Date: May 4-7, 2003vol. 2, on pp. 985-988 vol. 2 ISSN: 0840-7789 ISBN: 0-7803-7781-8.*

IP Telephony: Packet-based Multimedia Communications Systems, Pearson Education Limited (2000).*

Handley et al. SIP RFC 3261 (1999).*

Hechmi Khlifi, Anjali Agarwal, Jean-Charles Gregoire, A Framework to Use SIP in AD-HOC Networks, Electrical and Computer Engineering, 2003. IEEE CCECE 2003. Publication Date: May 4-7, 2003vol. 2, pp. 985-988.*

SIP: Session Initiation Protocol RFC 3261 (Jun. 2002).*

Rosenberg, J. et al., "SIP: Session Intitiation Protocol," Jun. 2002 (252 pages).

U.S. Appl. No. 10/642,127, Osborne et al.

Handley, M. et al., SDP: Session Description Protocol, RFC 2327, Apr. 1998, 42 pages.

Rosenberg, J. et al., Indicating User Agent Capabilities in the Session Initiation Protocol (SIP), RFC 3840, Aug. 2004, 36 pages.

* cited by examiner

ESTABLISHING A MULTIPARTY SESSION BY SENDING INVITATIONS IN PARALLEL

CROSS-REFERENCE TO RELATED APPLICATIONS

This application is related to U.S. patent application Ser. No. 11/140,614 entitled "SUPPORTING A SERIAL AND A PARALLEL INVITATION PROTOCOL," filed on May 27, 2005, now U.S. Pat. No. 7,660,850 issued Feb. 9, 2010, which is hereby incorporated by reference.

BACKGROUND

Applications sometimes need to establish and manage a session between computing devices, referred to as endpoints. A session is a set of interactions between computing devices that occurs over a period of time. As an example, real-time communications applications such as MICROSOFT WINDOWS MESSENGER or Voice over Internet Protocol ("VoIP") establish sessions between communicating devices on behalf of a user. These applications may use various mechanisms to establish sessions, such as a "Session Initiation Protocol" ("SIP"). SIP is an application-layer control protocol that devices can use to discover one another and to establish, modify, and terminate sessions between devices. SIP is an Internet proposed standard. Its specification, "RFC 3261," is available at <http://www.ietf.org/rfc/rfc3261.txt>.

A SIP network comprises entities that can participate in a dialog as a client, server, or both. SIP supports four types of entities: user agent, proxy server, redirect server, and registrar. User agents initiate and terminate sessions by exchanging messages with other SIP entities. A user agent can be a user agent client, which is generally a device that initiates SIP requests, or a user agent server, which is a device that generally receives SIP requests and responds to such requests. As examples, "IP-telephones," personal digital assistants, and any other type of computing device may be user agents. A device can be a user agent client in one dialog and a user agent server in another, or may change roles during the dialog. A proxy server is an entity that acts as a server to clients and a client to servers. In so doing, proxy servers intercept, interpret, or forward messages between clients and servers. A redirect server accepts a SIP request and generates a response directing the client that sent the request to contact an alternate network resource. A registrar is a server that accepts registration information from SIP clients and informs a location service of the received registration information.

SIP supports two message types: requests, which are sent from a client to a server, and responses, which are sent from a server to a client, generally when responding to a request. A SIP message is composed of three parts. The first part of a SIP message is a "start line," which includes fields to indicate a message type and a protocol version. The second part of a SIP message comprises header fields whose values are represented as name-value pairs. The third part of a SIP message is the message's body, which is used to describe the session to be initiated or contain data that relates to the session. Message bodies may appear in requests or responses.

SIP messages are routed based on the contents of their header fields. To be valid, a SIP request should contain at least the following six header fields: To, From, CSeq, Call-ID, Max-Forwards, and Via. The To header field indicates the logical identity of the recipient of the request. The From header field indicates the logical identity of the initiator of the request. The Max-Forwards header field indicates the number of hops a request can make before arriving at its destination. As an example, if a message from device A transits device B before arriving at destination device C, the message is said to have made two hops (e.g., to devices B and C). The Via header field indicates the path taken by the request so far (e.g., a sequence of network addresses of devices through which the request has transited) and indicates the path that should be followed when routing the response. Various network devices may insert Record-Route header fields when forwarding a SIP message in an attempt to force subsequent messages in a dialog to be routed through the device. The Record-Route header field may contain an identifier (e.g., network address) for the device and parameters. Devices that handle a message may force the message to be routed to devices listed in a message's Route header field. The Route header field values may be based on the Record-Route header field values inserted by devices. These and other header fields are described in the SIP specification referenced above.

A common form of real-time conversation is provided by instant messaging services. An instant messaging service allows participants at endpoints to send messages and have them received within a second or two by the other participants in the conversation. The receiving participants can then send responsive messages to the other participants in a similar manner.

When a participant at an endpoint wants to establish a multiparty session, for example, for sending instant messages between participants, the endpoints may be connected in a mesh configuration to support the signaling needed for the session. In a mesh configuration, each endpoint has a connection to each other endpoint. In the SIP protocol, an endpoint is connected to another endpoint when a dialog is established between the endpoints. To establish a connection with each other endpoint, each endpoint needs to be aware of the other endpoints in the session. Each endpoint that is to be in a multiparty session implements a serial invitation protocol for coordinating the sending of invitations and acceptances to establish the dialog between the endpoints in the session. A serial invitation protocol is used because, when an endpoint is invited, that endpoint needs to know about all the other endpoints currently in the session so that it can establish a dialog with each of those other endpoints. As a result, the endpoint that initiates the session needs to wait until it receives an acceptance or rejection from each endpoint before inviting another endpoint. The delay resulting from sending out the invitations serially is typically acceptable because an endpoint implementing the serial invitation protocol can automatically accept an invitation to establish a dialog of a session without having to ask the participant's permission to accept the invitation. Because each endpoint automatically accepts the invitation, there is typically very little delay between the sending of the first invitation and the receiving of the acceptance of the last invitation.

A difficulty occurs, however, when an endpoint no longer automatically accepts an invitation, but rather seeks permission from the participant to accept the invitation or delays for some other reason before automatically accepting an invitation. In such a case, there can be a considerable delay between when the first invitation is sent and when the last acceptance is received because of the aggregate delays of the endpoints. Moreover, in some cases, if an endpoint never responds to an invitation, the delay can be indefinite.

SUMMARY

A method and system for establishing a multiparty session with a mesh configuration by sending out invitations to endpoints in parallel is provided. A parallel invitation system implements a parallel invitation protocol that sends in parallel invitations to endpoints of participants that are being invited to join the session. To initiate a session, an initiating endpoint sends invitations in parallel to the endpoints that are to be in the session. When the initiating endpoint receives an acceptance, it then sends to the accepting endpoint an indication of the other endpoints that are currently in the session, that is, those endpoints that have already accepted invitations. When an accepting endpoint receives the indication of the endpoints in the session, the accepting endpoint sends an invitation to establish a dialog to each of the indicated endpoints. When an endpoint that is in the session receives such an invitation, it can automatically accept the invitation because it is already participating in the session.

The parallel invitation system may allow endpoints that support only a serial invitation protocol to participate in a multiparty session. When an initiating endpoint sends initial invitations to the endpoints in parallel, it indicates that it requires the invited endpoints to support the parallel invitation protocol. An invited endpoint that does not support the parallel invitation protocol will reject the invitation. After all the initial invitations have been accepted or rejected, the initiating endpoint then sends in serial to the endpoints that rejected the initial invitations in serial invitations indicating that the serial invitation protocol is supported. The parallel invitation system invites in parallel those endpoints that support the parallel invitation protocol and invites in serial those endpoints that support only the serial invitation protocol.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
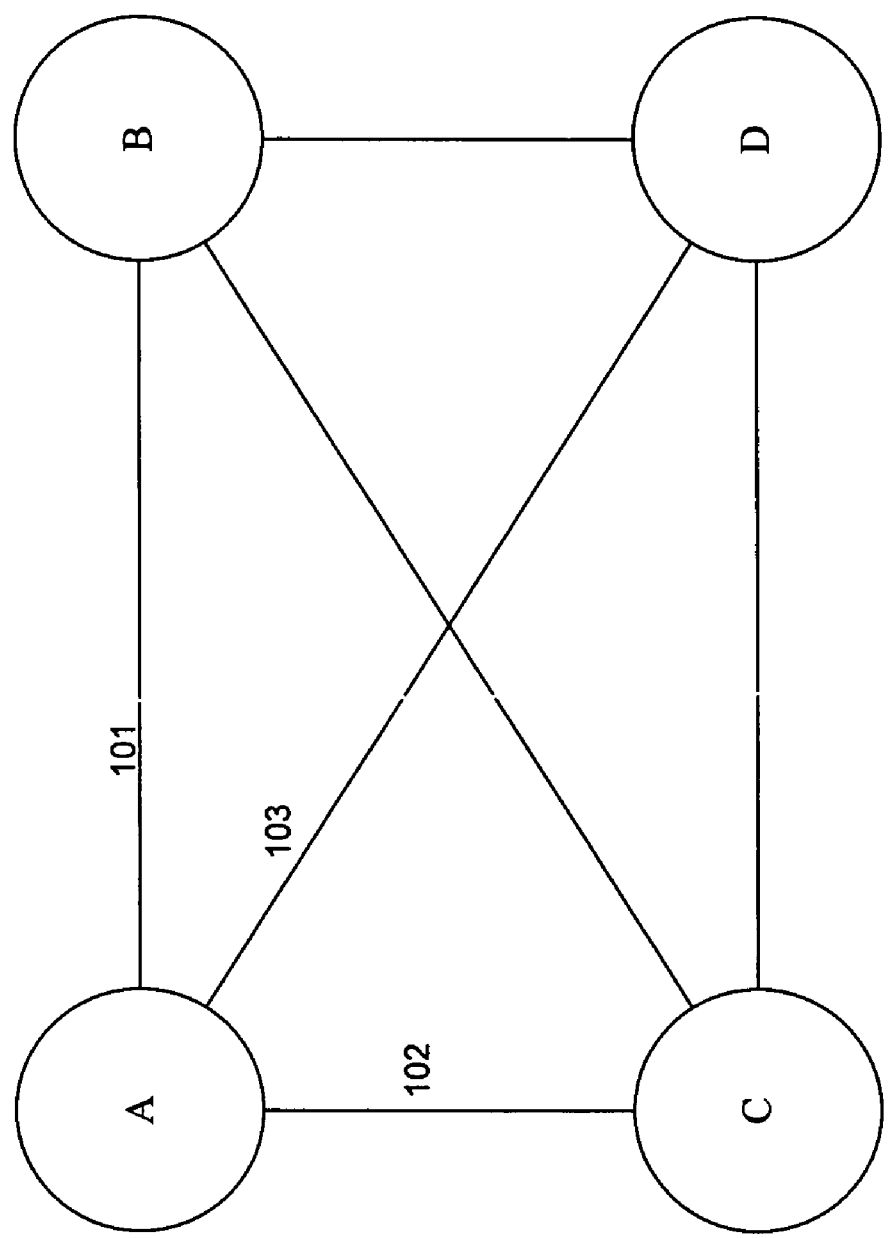
FIG. 1 is a diagram that illustrates a mesh configuration for a multiparty session.

A method and system for establishing a multiparty session with a mesh configuration by sending out invitations to endpoints in parallel is provided. In one embodiment, a parallel invitation system implements a parallel invitation protocol that sends in parallel invitations to endpoints of participants that are being invited to join the session. To initiate a session, an initiating endpoint sends invitations in parallel to the endpoints that are to be in the session. When an invited endpoint receives an invitation, the invited endpoint may prompt the participant at that endpoint for permission to accept the invitation. When permission is received, the invited endpoint sends an acceptance to the initiating endpoint. When the initiating endpoint receives an acceptance, it then sends to the accepting endpoint an indication of the other endpoints that are currently in the session, that is, those endpoints that have already accepted invitations. When an accepting endpoint receives the indication of the endpoints in the session, the accepting endpoint needs to establish a dialog with the other endpoints in the session to complete the mesh configuration. As a result, the accepting endpoint sends an invitation to establish a dialog to each of the indicated endpoints. When an endpoint that is in the session receives such an invitation, it can automatically accept the invitation because it already has the participant's permission to participate in the session. In this way, the parallel invitation system can send invitations using a parallel invitation protocol and can avoid the aggregate delay that is inherent in a serial invitation protocol.

In one embodiment, after a session has been established, an inviting endpoint may invite additional endpoints to join the session. In such a case, the inviting endpoint may indicate in the invitation the endpoints that are currently participating in the session. An invited endpoint may decide whether to accept the invitation based in part on the indicated endpoints currently participating. When the invited endpoint accepts the invitation, it can then begin establishing a dialog with each of the indicated endpoints without having to wait until after inviting endpoint receives the acceptance. When the inviting endpoint receives an acceptance, it may, however, send to the accepting participant an indication of those endpoints that have joined the session after the invitation was initially sent to the accepting endpoint. More generally, the inviting endpoint may identify the participant endpoints to an invited participant at various points during the invitation process. The inviting participant may also indicate in an invitation the endpoints that have been invited but not yet accepted ("sending endpoints") or may be invited but have not yet been able to join the session ("potential endpoints"). Upon receiving the invitations, the invited endpoint can decide whether to accept the invitation based in part on those indicated endpoints.

In one embodiment, the parallel invitation system designates an endpoint of a session to be the roster manager endpoint. The roster manager endpoint is responsible for maintaining the roster of the participants in the session and their corresponding endpoints. The roster manager endpoint is responsible for initiating a session by sending invitations to the endpoints of the initial participants and for adding new participants to the session by sending invitations to the endpoints of the new participants. When a session is initiated, the initiating endpoint assumes the roster manager role. When a participant is to be added to the session, the roster manager endpoint sends the invitation to that participant. If a participant at an endpoint other than the roster manager endpoint decides to add a participant, then that endpoint needs to refer that participant to the roster manager endpoint so that the roster manager endpoint can send out the invitation. When the roster manager endpoint sends an invitation, it can indicate the endpoints that are currently in the session. When the invited endpoint receives the invitation, then the invited endpoint can then send out invitations to establish dialog with the other endpoints in the session to complete the mesh configuration.

In one embodiment, the parallel invitation system allows different endpoints to assume the roster manager role when the endpoint that currently has the roster manager role leaves the session. The parallel invitation system uses a distributed approach for electing a new roster manager. When an endpoint detects that there is no roster manager endpoint, it becomes a candidate endpoint to assume the roster manager role and sends to each other endpoint in the session an election request that it be elected. The request includes a "bid amount" that can be used to resolve conflicts when multiple endpoints send requests to be elected roster manager. When an endpoint receives an election request, it decides whether to support the election of the candidate endpoint. If the endpoint that receives the election request has not sent out its own election request, then it automatically notifies the candidate endpoint that it will allow the election of the candidate endpoint. When a candidate endpoint receives such a notification from all other endpoints, it assumes the roster manager role. If, however, the endpoint that receives an election request has already sent out its own election request, then it decides whether to allow the candidate endpoint to be elected based on comparison of bid amounts. If the endpoint that previously sent out an election request had a higher bid amount, then it sends a notification to the candidate endpoint that it will not allow the election of the candidate endpoint. Because the candidate endpoint receives at least one notification of non-allowance, it does not assume the roster manager role. As a result, the candidate endpoint that has the highest bid amount ultimately assumes the roster manager role. After an endpoint assumes the roster manager role, it sends to each endpoint in the session an indication that it has assumed the role. The bid amount may be a number that is generated randomly by each endpoint that is large enough so that the probability of two endpoints generating the same random number is small. One skilled in the art will appreciate that the bid amount may be other values, such as a unique network address, participant's identification, and so on. In one embodiment, an endpoint does not send out an election request until it needs to add a participant to the session. As a result, the session may proceed for some time without a roster manager endpoint. The resulting delay in electing a new roster manager will help avoid serial election of roster managers as the session is being terminated by the participants. Without the delay, each time a roster manager endpoint leaves the session a new one is immediately elected, which then quickly leaves the session as part of the termination and a new roster manager is again elected.

In one embodiment, the parallel invitation system allows endpoints that support only a serial invitation protocol to participate in a multiparty session. When an initiating endpoint sends initial invitations to the endpoints in parallel, it indicates that it requires the invited endpoints to support the parallel invitation protocol. All the invited endpoints that support the parallel invitation protocol will accept the invitation. An invited endpoint that does not support the parallel invitation protocol will, however, reject the invitation and may indicate that it supports the serial invitation protocol. When the initiating endpoint receives the rejection, it notes the rejection. After all the initial invitations have been accepted or rejected, the initiating endpoint then sends in serial to the endpoints that rejected the initial invitations invitations indicating that the serial invitation protocol is supported. Thus, the parallel invitation system invites in parallel those endpoints that support the parallel invitation protocol and invites in serial those endpoints that support only the serial invitation protocol. Alternatively, if the initiating endpoint knows in advance that an endpoint does not support the parallel invitation protocol, it can avoid sending the initial invitation in parallel to that endpoint and instead only send its invitation in parallel. An initiating endpoint may determine whether another endpoint supports the parallel invitation protocol based in presence information published by the other endpoint. In this way, a multiparty session can be established with endpoints that support either the parallel invitation protocol or the serial invitation protocol.

FIG. 1 is a diagram that illustrates a mesh configuration for a multiparty session. Each endpoint A, B, C, and D is connected to, that is, has a dialog established with, each other endpoint. A connection is indicated by a straight line between a pair of endpoints. For example, endpoint A is connected to endpoint B as indicated by line 101, to endpoint C as indicated by line 102, and to endpoint D as indicated by line 103.

Figure 2:
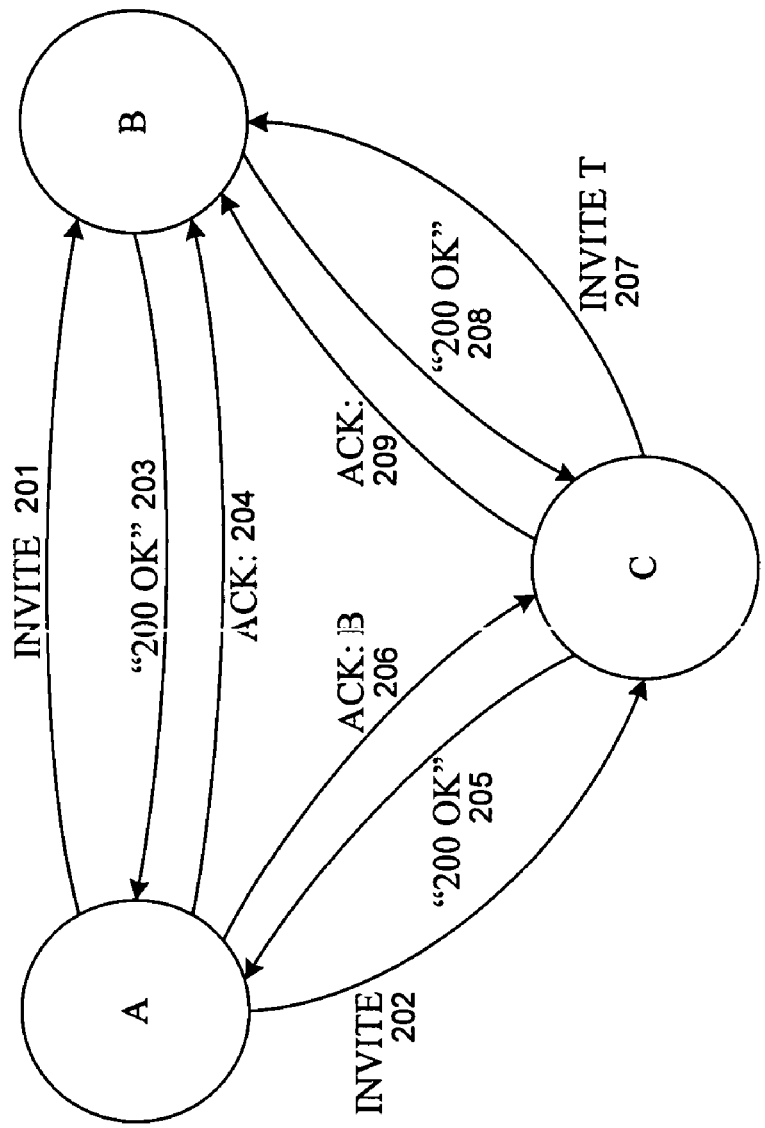
FIG. 2 is a message flow diagram that illustrates messages sent to establish a three-party session using the parallel invitation system implemented using the Session Initiation Protocol in one embodiment.

FIG. 2 is a message flow diagram that illustrates messages sent to establish a three-party session using the parallel invitation system implemented using the Session Initiation Protocol in one embodiment. Endpoint A initiates a session that is to include participants at endpoint B and endpoint C. Endpoint A initially sends 201 an invite request to endpoint B and sends 202 an invite request to endpoint C in parallel. The invite request indicates that endpoint A supports the parallel invitation protocol and that endpoint A is the roster manager. When endpoint B receives the invite request, it sends 203 a 200 OK response indicating that it requires the parallel invitation protocol. Endpoint A sends 204 an acknowledgment to endpoint B. The acknowledgment indicates that endpoint A is the only endpoint currently in the session. As a result, endpoint B does not need to establish a connection with any other endpoints at that time. Endpoint C eventually sends 205 a 200 OK response to endpoint A indicating that it requires the parallel invitation protocol. Endpoint A sends 206 an acknowledgment to endpoint C indicating that endpoint A and endpoint B are currently in the session. When endpoint C receives the acknowledgment, it sends 207 a triggered invite request to endpoint B indicating that it supports the parallel invitation protocol and requires the serial invitation protocol. When an endpoint is being invited to establish a dialog as part of joining the session, it is sent a "normal" invite request. However, when an endpoint is being invited to establish a dialog to complete the message configuration by an endpoint that has just joined the session, it is sent a "triggered" invite request. A triggered invite request can be automatically accepted because the participant has already given permission to join the session. Endpoint B sends 208 a 200 OK response indicating that it supports the parallel invitation protocol. Endpoint C then sends 209 an acknowledgment to endpoint B. Table 1 contains portions of SIP messages that are sent between endpoints A, B, and C to establish the mesh session. In the tables, "ms-msp" identifies the parallel invitation protocol, and "com.microsoft.rtc-multiparty" identifies the serial invitation protocol.

TABLE 1

| From->To | SIP Message |
|---|---|
| A->B | INVITE sip:B@Microsoft.com SIP/2.0<br>To: sip:B@Microsoft.com<br>From: Participant A <sip:A@Microsoft.com><br>Call-ID: 99544890<br>CSeq: 1 INVITE<br>Require: ms-msp<br>Endpoints: Participant A <sip:A@Microsoft.com><br>Roster-Manager: sip:A@Microsoft.com<br>Content-Type: application/SDP<br>Content-Length: XXX |
| A->C | INVITE sip:C@Microsoft.com SIP/2.0<br>To: sip:C@Microsoft.com<br>From: Participant A <sip:A@Microsoft.com><br>Call-ID: 99544890<br>CSeq: 1 INVITE<br>Require: ms-msp<br>Endpoints: Participant A <sip:A@Microsoft.com><br>Roster-Manager: sip:A@Microsoft.com<br>Content-Type: application/SDP<br>Content-Length: XXX |
| B->A | SIP/2.0 200 OK<br>To: sip:B@Microsoft.com<br>From: Participant A <sip:A@Microsoft.com><br>CSeq: 1 INVITE<br>Call-ID: 99544890<br>Require: ms-msp<br>Content-Type: application/SDP<br>Content-Length: XXX |
| A->B | ACK sip:B@Microsoft.com SIP/2.0<br>To: sip:B@Microsoft.com<br>From: Participant A <sip:A@Microsoft.com><br>CSeq: 1 ACK<br>Call-ID: 99544890<br>Content-Length: 0 |
| C->A | SIP/2.0 200 OK<br>To: sip:C@Microsoft.com<br>From: Participant A <sip:A@Microsoft.com><br>CSeq: 1 INVITE<br>Call-ID: 99544890<br>Require: ms-msp<br>Content-Type: application/SDP<br>Content-Length: XXX |
| A->C | ACK sip:C@Microsoft.com SIP/2.0<br>To: sip:C@Microsoft.com<br>From: Participant A <sip:A@Microsoft.com><br>CSeq: 1 ACK<br>Endpoints: Participant B <sip:B@Microsoft.com><br>Call-ID: 99544890<br>Content-Length: 0 |
| C->B | INVITE sip:B@Microsoft.com SIP/2.0<br>To: sip:C@Microsoft.com<br>From: Participant B <sip:B@Microsoft.com><br>Call-ID: 99544890<br>CSeq: 1 INVITE<br>Require: com.microsoft.rtc-multiparty<br>Supported: ms-msp<br>TriggeredInvite: TRUE<br>Roster-Manager: sip:A@Microsoft.com<br>Content-Type: application/SDP<br>Content-Length: XXX |
| B->C | SIP/2.0 200 OK<br>To: sip:C@Microsoft.com<br>From: Participant B <sip:B@Microsoft.com><br>CSeq: 1 INVITE<br>Require: com.microsoft.rtc-multiparty<br>Support: ms-msp<br>Call-ID: 99544890<br>Content-Type: application/SDP<br>Content-Length: XXX |
| C->B | ACK sip:B@Microsoft.com SIP/2.0<br>To: sip:B@Microsoft.com<br>From: Participant C <sip:B@Microsoft.com><br>CSeq: 1 ACK<br>Call-ID: 99544890<br>Content-Length: 0 |

Figure 3:
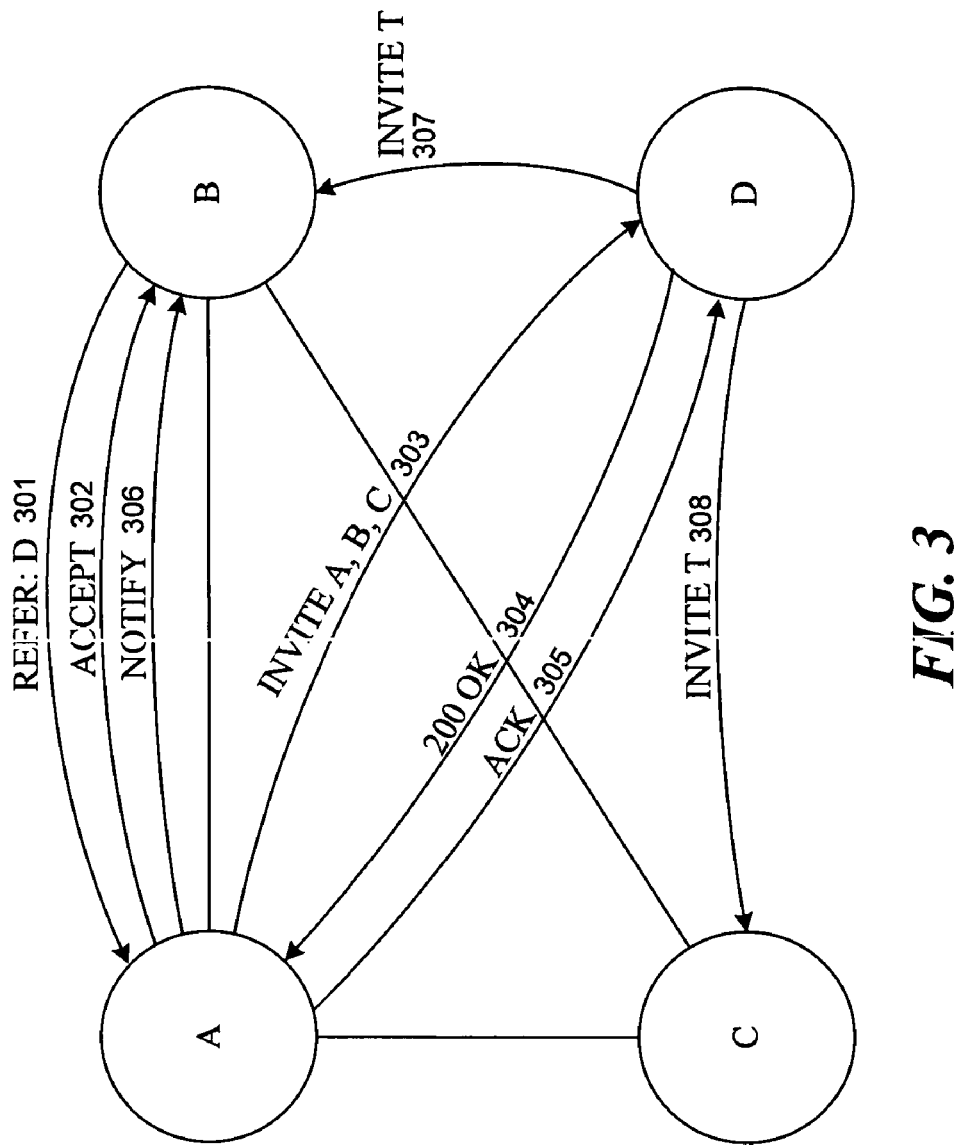
FIG. 3 is a message flow diagram that illustrates messages sent to add a participant that supports the parallel invitation protocol to an already established session.

FIG. 3 is a message flow diagram that illustrates messages sent to add a participant that supports the parallel invitation protocol to an already established session. In this example, endpoint B wants to invite endpoint D, which supports the parallel invitation protocol, to join the session. Endpoint B, however, is not the roster manager. So, endpoint B sends 301 a refer request identifying endpoint D to the roster manager, endpoint A. Endpoint A sends 302 an accept response to endpoint B. Endpoint A then sends 303 an invite request to endpoint D indicating that the parallel invitation protocol is required and identifying that endpoints A, B, and C are currently in the session. Because it supports the parallel invitation protocol, endpoint D sends 304 a 200 OK response to endpoint A indicating that it requires the parallel invitation protocol. Endpoint A sends 305 an acknowledgment to endpoint D. Endpoint A sends 306 a notify message to endpoint B to indicate that endpoint D is joining the session, and endpoint B sends a 200 OK response to endpoint A (not shown). Upon receiving the acknowledgment, endpoint D sends 307 and 308 a triggered invite to endpoints B and C, respectively, indicating that the serial invitation protocol is required and the parallel invitation protocol is supported. This ensures the request is accepted by both serial and parallel invitation protocol endpoints. The response to the triggered invite indicates whether the serial and parallel invitation protocols are supported by the invited endpoint. To establish the dialog, endpoints B and C then send 200 OK responses, and endpoint D sends acknowledgments to endpoints B and C. Table 2 contains portions of the SIP messages that are sent between endpoints A, B, C, and D to add endpoint D to the session.

TABLE 2

| From->To | SIP Message |
|---|---|
| B->A | REFER sip:A@Microsoft.com SIP/2.0<br>To: <sip:A@Microsoft.com><br>From: <sip:B@Microsoft.com><br>Call-ID: 1234567890<br>CSeq: 2 REFER<br>Refer-To: sip:D@Microsoft.com<br>Require: com.microsoft.rtc-multiparty |

TABLE 2-continued

| From->To | SIP Message |
|---|---|
| A->B | SIP/2.0 202 Accepted<br>To: <sip:A@Microsoft.com><br>From: <sip:B@Microsoft.com><br>Call-ID: 1234567890<br>CSeq: 2 REFER |
| A->D | INVITE sip:D@Microsoft.com SIP/2.0<br>To: sip:D@Microsoft.com<br>From: Participant A <sip:A@Microsoft.com><br>Call-ID: 1234567890<br>CSeq: 1 INVITE<br>Referred-By: sip:B@Microsoft.com<br>Require: ms-msp<br>Endpoints: Participant A <sip:A@Microsoft.com>,<br>Participant B<br><sip:B@Microsoft.com>; Participant C<br><sip:C@Microsoft.com>;<br><sip:D@Microsoft.com><br>Roster-Manager: sip:A@Microsoft.com<br>Content-Type: application/SDP<br>Content-Length: XXX |
| D->A | SIP/2.0 200 OK<br>To: sip:D@Microsoft.com<br>From: Participant A <sip:A@Microsoft.com><br>Call-ID: 1234567890<br>CSeq: 1 INVITE<br>Require: ms-msp<br>Content-Type: application/SDP<br>Content-Length: XXX |
| A->D | ACK sip:D@Microsoft.com SIP/2.0<br>To: sip:D@Microsoft.com<br>From: Participant A <sip:A@Microsoft.com><br>Call-ID: 1234567890<br>CSeq: 1 ACK<br>Content-Length: 0 |
| A->B | NOTIFY B@Microsoft.com<br>From: <sip:A@Microsoft.com><br>To: <sip:B@Microsoft.com><br>Call-ID: 1234567890<br>CSeq: 34 REFER<br>Event: refer; id = 2<br>Content-Type: application/sipfrag<br>Content-Length: 16 |
| B->A | SIP/2.0 200 OK<br>From: <sip:A@Microsoft.com><br>To: <sip:B@Microsoft.com><br>Call-ID: 1234567890<br>CSeq: 34 NOTIFY |
| D->B | INVITE sip:B@Microsoft.com SIP/2.0<br>To: sip:B@Microsoft.com<br>From: Particpiant D <sip:D@Microsoft.com><br>Call-ID: 1234567890<br>CSeq: 1 INVITE<br>TriggeredInvite: TRUE<br>Supported: ms-msp<br>Require: com.microsoft.rtc-multiparty<br>Content-Type: application/SDP<br>Content-Length: XXX |
| D->C | INVITE sip:C@Microsoft.com SIP/2.0<br>To: sip:C@Microsoft.com<br>From: Particpiant D <sip:D@Microsoft.com><br>Call-ID: 12345678980<br>CSeq: 1 INVITE<br>TriggeredInvite: TRUE<br>Require: com.microsoft.rtc-multiparty,ms-msp<br>Supported: ms-msp<br>Content-Type: application/SDP<br>Content-Length: XXX |
| B->D | SIP/2.0 200 OK<br>To: sip:B@Microsoft.com<br>From: Participant D <sip:D@Microsoft.com><br>Call-ID: 1234567890<br>CSeq: 1 INVITE<br>Require: ms-msp<br>Content-Type: application/SDP<br>Content-Length: XXX |
| C->D | SIP/2.0 200 OK<br>To: sip:C@Microsoft.com<br>From: Particpiant D <sip:D@Microsoft.com><br>Call-ID: 1234567890<br>CSeq: 1 INVITE<br>Require: ms-msp<br>Content-Length: XXX |
| D->B | ACK sip:B@Microsoft.com SIP/2.0<br>To: sip:B@Microsoft.com<br>From: Participant D <sip:D@Microsoft.com><br>Call-ID: 1234567890<br>CSeq: 1 ACK<br>Content-Length: 0 |
| D->C | ACK sip:C@Microsoft.com SIP/2.0<br>To: sip:C@Microsoft.com<br>From: Participant D <sip:D@Microsoft.com><br>Call-ID: 1234567890<br>CSeq: 1 ACK<br>Content-Length: 0 |

Figure 4:
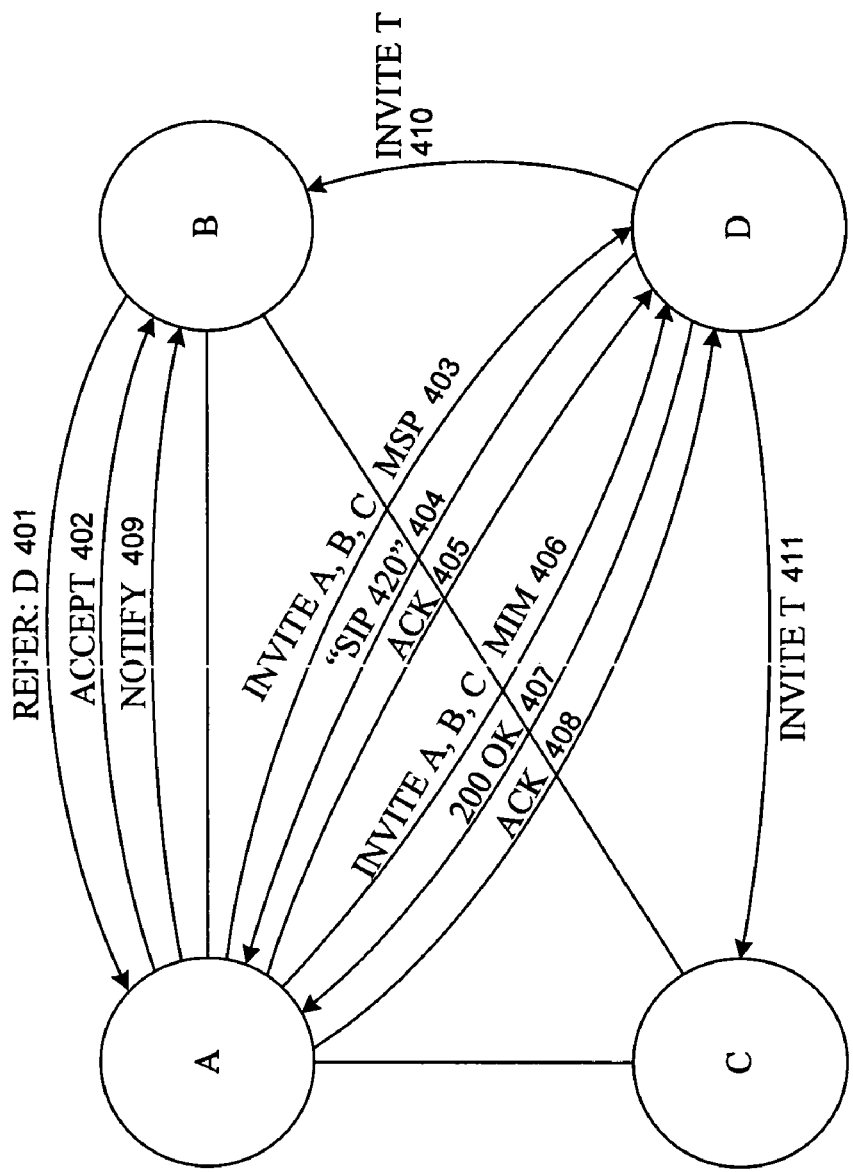
FIG. 4 is a message flow diagram that illustrates the messages sent to add a participant that does not support the parallel invitation protocol to an already established session.

FIG. 4 is a message flow diagram that illustrates the messages sent to add a participant that does not support the parallel invitation protocol to an already established session. In this example, endpoint B wants to invite endpoint D, which does the roster manager. So, endpoint B sends 401 a refer request identifying endpoint D to the roster manager, endpoint A. Endpoint A sends 402 an accept response to endpoint B. Endpoint A then sends 403 an invite request to endpoint D indicating that the parallel invitation protocol is required and identifying that endpoints A, B, and C all are currently in the session. Because it does not support the parallel invitation protocol, endpoint D sends 404 a 420 bad extension response. Endpoint A then sends 405 an acknowledgment to endpoint D. Endpoint A sends 406 an invite request to endpoint D indicating that the serial invitation protocol is required and identifying that endpoints A, B, and C are currently in the session. Because it supports the serial invitation protocol, endpoint D sends 407 a 200 OK response to endpoint A indicating that it requires the serial invitation protocol. Endpoint A sends 408 an acknowledgment to endpoint D. Endpoint A sends 409 a notify message to endpoint B to indicate that endpoint D is joining the session, and endpoint B sends a 200 OK response (not shown). Upon receiving the acknowledgment, endpoint D sends 410 and 411 a triggered invite to endpoints B and C, respectively, indicating that the serial invitation protocol is supported. To establish the dialog, endpoints B and C then send 200 OK responses, and endpoint D sends acknowledgments to endpoints B and C. Table 3 contains portions of the SIP messages that are sent between endpoints A, B, C, and D to add endpoint D to the session.

TABLE 3

| From->To | SIP Message |
|---|---|
| B->A | REFER sip:A@Microsoft.com SIP/2.0<br>To: <sip:A@Microsoft.com><br>From: <sip:B@Microsoft.com><br>Call-ID: 1234567890<br>CSeq: 2 REFER<br>Refer-To: sip:D@Microsoft.com<br>Require: com.microsoft.rtc-multiparty |
| A->B | SIP/2.0 202 Accepted<br>To: <sip:A@Microsoft.com><br>From: <sip:B@Microsoft.com><br>Call-ID: 1234567890<br>CSeq: 2 REFER |
| A->D | INVITE sip:D@Microsoft.com SIP/2.0<br>To: sip:D@Microsoft.com<br>From: Participant A <sip:A@Microsoft.com> |

TABLE 3-continued

| From->To | SIP Message |
|---|---|
| | Call-ID: 1234567890 |
| | CSeq: 1 INVITE |
| | Referred-By: sip:B@Microsoft.com |
| | Require: ms-msp |
| | Endpoints: Participant A <sip:A@Microsoft.com>, Participant B <sip:B@Microsoft.com>; Participant C <sip:C@Microsoft.com>; <sip:D@Microsoft.com> |
| | Roster-Manager: sip:A@Microsoft.com |
| | Content-Type: application/SDP |
| | Content-Length: XXX |
| D->A | SIP/2.0 420 Bad Extension |
| | To: sip:D@Microsoft.com |
| | From: Participant A <sip:A@Microsoft.com> |
| | Call-ID: 1234567890 |
| | CSeq: 1 INVITE |
| | Unsupported: ms-msp |
| | Content-Length: 0 |
| A->D | ACK sip:D@Microsoft.com SIP/2.0 |
| | To: sip:D@Microsoft.com |
| | From: Participant A <sip:A@Microsoft.com> |
| | Call-ID: 1234567890 |
| | CSeq: 1 ACK |
| | Content-Length: 0 |
| A->D | INVITE sip:D@Microsoft.com SIP/2.0 |
| | To: sip:D@Microsoft.com |
| | From: Participant A <sip:A@Microsoft.com> |
| | Call-ID: 1234567890 |
| | CSeq: 2 INVITE |
| | Referred-By: sip:B@Microsoft.com |
| | Require: com.microsoft.rtc-multiparty |
| | Endpoints: Participant A <sip:A@Microsoft.com>, Participant B <sip:B@Microsoft.com>; Participant C <sip:C@Microsoft.com>; <sip:D@Microsoft.com> |
| | Roster-Manager: sip:A@Microsoft.com |
| | Content-Type: application/SDP |
| | Content-Length: XXX |
| D->A | SIP/2.0 200 OK |
| | To: sip:D@Microsoft.com |
| | From: Participant A <sip:A@Microsoft.com> |
| | Call-ID: 1234567890 |
| | CSeq: 2 INVITE |
| | Require: com.microsoft.rtc-multiparty |
| | Contact: sip:A@Microsoft.com |
| | Content-Type: application/SDP |
| | Content-Length: XXX |
| A->D | ACK sip:D@Microsoft.com SIP/2.0 |
| | To: sip:D@Microsoft.com |
| | From: Participant A <sip:A@Microsoft.com> |
| | Call-ID: 1234567890 |
| | CSeq: 2 ACK |
| | Content-Length: 0 |
| A->B | NOTIFY B@Microsoft.com |
| | From: <sip:A@Microsoft.com> |
| | To: <sip:B@Microsoft.com> |
| | Call-ID: 1234567890 |
| | CSeq: 34 NOTIFY |
| | Event: refer; id = 2 |
| | Contact: sip:B@Microsoft.com |
| | Content-Type: application/sipfrag |
| | Content-Length: 16 |
| B->A | SIP/2.0 200 OK |
| | From: <sip:A@Microsoft.com> |
| | To: <sip:B@Microsoft.com> |
| | Call-ID: 1234567890 |
| | CSeq: 34 NOTIFY |
| D->B | INVITE sip:B@Microsoft.com SIP/2.0 |
| | To: sip:B@Microsoft.com |
| | From: Particpiant D <sip:D@Microsoft.com> |
| | Call-ID: 1234567890 |
| | CSeq: 1 INVITE |
| | TriggeredInvite: TRUE |
| | Require: com.microsoft.rtc-multiparty |

TABLE 3-continued

| From->To | SIP Message |
|---|---|
| | Content-Type: application/SDP |
| | Content-Length: XXX |
| D->C | INVITE sip:C@Microsoft.com SIP/2.0 |
| | To: sip:C@Microsoft.com |
| | From: Particpiant D <sip:D@Microsoft.com> |
| | Call-ID: 12345678980 |
| | CSeq: 1 INVITE |
| | TriggeredInvite: TRUE |
| | Require: com.microsoft.rtc-multiparty |
| | Content-Type: application/SDP |
| | Content-Length: XXX |
| B->D | SIP/2.0 200 OK |
| | To: sip:B@Microsoft.com |
| | From: Particpiant D <sip:D@Microsoft.com> |
| | Call-ID: 1234567890 |
| | CSeq: 1 INVITE |
| | Require: com.microsoft.rtc-multiparty |
| | Content-Type: application/SDP |
| | Content-Length: XXX |
| C->D | SIP/2.0 200 OK |
| | To: sip:C@Microsoft.com |
| | From: Particpiant D <sip:D@Microsoft.com> |
| | Call-ID: 1234567890 |
| | CSeq: 1 INVITE |
| | Require: com.microsoft.rtc-multiparty |
| | Content-Length: XXX |
| D->B | ACK sip:B@Microsoft.com SIP/2.0 |
| | To: sip:B@Microsoft.com |
| | From: Particpiant D <sip:D@Microsoft.com> |
| | Call-ID: 1234567890 |
| | CSeq: 1 ACK |
| | Content-Length: 0 |
| D->C | ACK sip:C@Microsoft.com SIP/2.0 |
| | To: sip:C@Microsoft.com |
| | From: Particpiant D <sip:D@Microsoft.com> |
| | Call-ID: 1234567890 |
| | CSeq: 1 ACK |
| | Content-Length: 0 |

Figure 5:
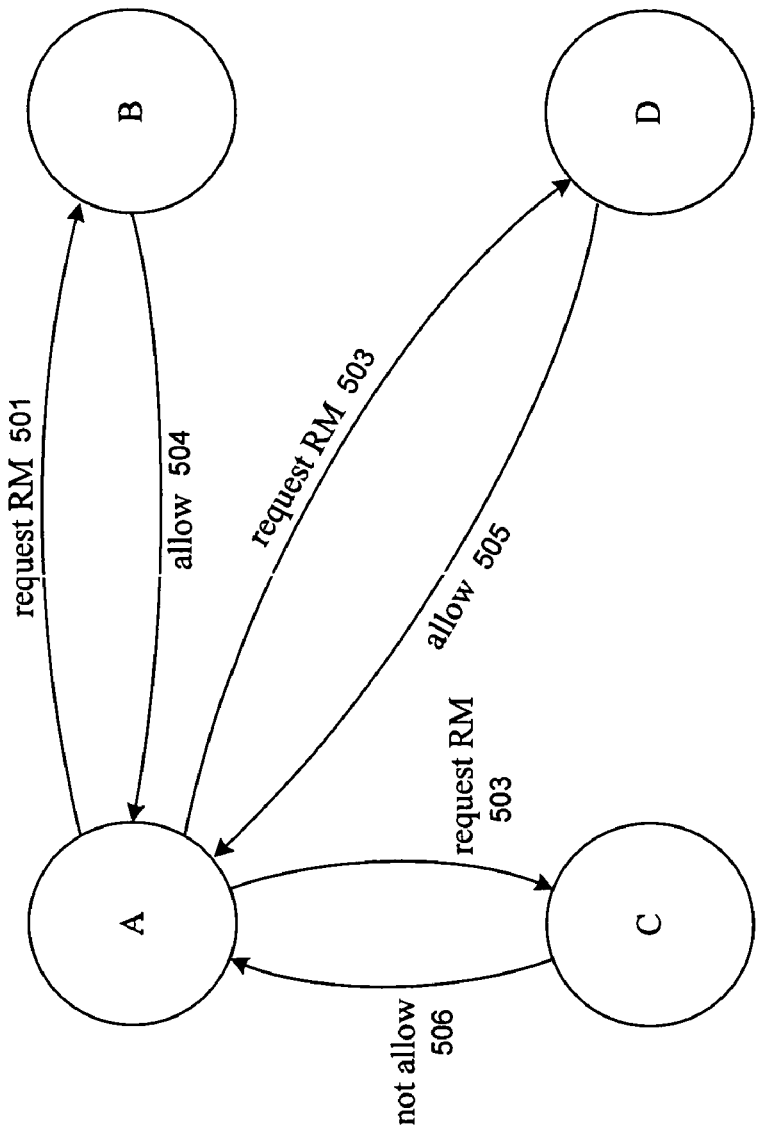
FIG. 5 is a message flow diagram that illustrates the messages sent between endpoints to elect a new roster manager.

FIG. 5 is a message flow diagram that illustrates the messages sent between endpoints to elect a new roster manager. Endpoints A, B. C, and D are in the session. The previous roster manager may have been endpoint E that recently left the session. In this example, endpoint A detects that there currently is no roster manager. As a result, endpoint A becomes a candidate and sends 501, 502, and 503 an elect roster manager request to endpoints B, C, and D. The roster manager request includes a bid (e.g., a random number) generated by endpoint A for use when multiple endpoints try to become a new roster manager at the same time. The endpoint that generates the highest bid is elected roster manager. In this example, endpoints B and D had not previously detected that there was no roster manager and so did not become candidates. Thus, endpoints B and D send 504 and 505 allow responses to endpoint A indicating that these endpoints will allow endpoint A to become the roster manager. Endpoint C, however, also detected that there was no roster manager and sent a roster manager request to the other participants. In this example, endpoint C generated a higher bid than endpoint A and thus sends 506 a not allow response to endpoint A. The elect requests sent by endpoint C are not shown in FIG. 5. Eventually, endpoint C will decide that it has been elected roster manager because all the other endpoint will allow its election and send set roster manager requests to endpoints A, B, and D. Table 4 contains portions of the SIP messages that are sent between endpoints A, B, C, and D to elect a roster manager.

TABLE 4

| From->To | SIP Message |
|---|---|
| C->A | INFO sip:A@Microsoft.com SIP/2.0<br>To: sip:A@Microsoft.com<br>From: sip:C@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRM uri="sip:C@Microsoft.com" bid="5555"/><br></action> |
| A->B | INFO sip:B@Microsoft.com SIP/2.0<br>To: sip:B@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRM uri="sip:A@Microsoft.com" bid="4444"/><br></action> |
| A->C | INFO sip:C@Microsoft.com SIP/2.0<br>To: sip:C@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRM uri="sip:A@Microsoft.com" bid="4444"/><br></action> |
| A->D | INFO sip:D@Microsoft.com SIP/2.0<br>To: sip:D@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRM uri="sip:A@Microsoft.com" bid="4444"/><br></action> |
| B->A | SIP/2.0 200 OK<br>To: sip:B@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRMResponse uri="sip:A@Microsoft.com"<br>  allow="true"/><br></action> |
| D->A | SIP/2.0 200 OK<br>To: sip:D@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRMResponse uri="sip:A@Microsoft.com"<br>  allow="true"/><br></action> |
| C->A | SIP/2.0 200 OK<br>To: sip:C@Microsoft.com<br>From: sip:A@Microsoft.com<br>Call-ID: 1234567890<br>CSeq: 20 INFO<br>Content-Type: application/ms-mim<br>Content-Length: XXX<br><action xmlns="http://schemas.microsoft.com/sip/multiparty/"><br>  <RequestRMResponse uri="sip:A@Microsoft.com"<br>  allow="false"/><br></action> |
| C->A | INFO sip:A@Microsoft.com SIP/2.0<br>To: sip:A@Microsoft.com<br>From: sip:C@Microsoft.com<br>Call-ID: 1234567890<br>CSeq: 21 INFO<br>Content-Type: application/ms-mim<br>Content-Length: XXX<br><action xmlns="http://schemas.microsoft.com/sip/multiparty/"><br>  <SetRM uri="sip:C@Microsoft.com"/><br></action> |
| C->B | INFO sip:B@Microsoft.com SIP/2.0<br>To: sip:B@Microsoft.com<br>From: sip:C@Microsoft.com<br>Call-ID: 1234567890<br>CSeq: 21 INFO<br>Content-Type: application/ms-mim<br>Content-Length: XXX<br><action xmlns="http://schemas.microsoft.com/sip/multiparty/"><br>  <SetRM uri="sip:C@Microsoft.com"/><br></action> |
| C->D | INFO sip:D@Microsoft.com SIP/2.0<br>To: sip:D@Microsoft.com<br>From: sip:C@Microsoft.com<br>Call-ID: 1234567890<br>CSeq: 21 INFO<br>Content-Type: application/ms-mim<br>Content-Length: XXX<br><action xmlns="http://schemas.microsoft.com/sip/multiparty/"><br>  <SetRM uri="sip:C@Microsoft.com"/><br></action> |
| C->B | SIP/2.0 200 OK<br>To: sip:C@Microsoft.com<br>From: sip:B@Microsoft.com<br>Call-ID: 1234567890<br>CSeq: 21 INFO<br>Content-Type: application/ms-mim<br>Content-Length: XXX<br><action xmlns="http://schemas.microsoft.com/sip/multiparty/"><br>  <SetRMResponse uri="sip:B@Microsoft.com"/><br></action> |

Figure 6:
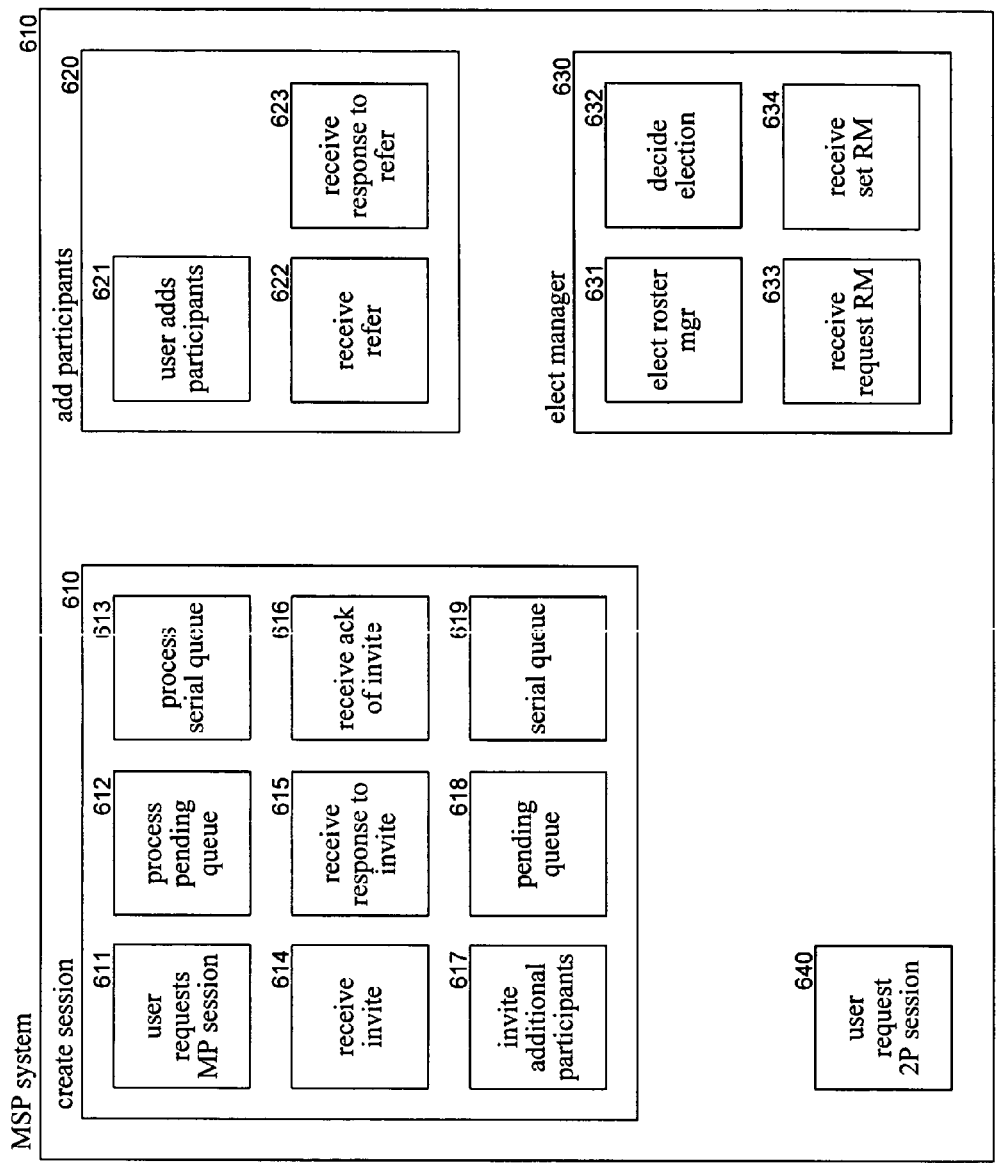
FIG. 6 is a block diagram illustrating components of the parallel invitation system in one embodiment.

FIG. 6 is a block diagram illustrating components of the parallel invitation system in one embodiment. The parallel invitation system 601 includes a create session subsystem 610, an add participants subsystem 620, an elect manager subsystem 630, and a user requests two-party session component 640. The create session subsystem includes a user requests multiparty session component 611, a process pending queue component 612, a process serial queue component 613, a receive invite component 614, a receive response to invite component 615, a receive acknowledgment of invite component 616, and an invite additional participants component 617. The create session subsystem also includes a pending queue 618 and a serial queue 619. The pending queue contains the identification of the participants that are to be added to the established session. The serial queue contains the identification of the participants whose endpoints do not support the parallel invitation protocol and thus need to be invited using the serial invitation protocol to the session. The user requests multiparty session component adds endpoints of participants to a session to be established. The process pending queue component is invoked to send invitations to the endpoints of the participants in the pending queue. The process serial queue component is invoked to send invitations serially to the endpoints of the participants in the serial queue. The receive invite component is invoked to process invite requests received at an endpoint. The receive response to invite component is invoked to process a response to an invite request. The receive acknowledgment of invite component is invoked to process an acknowledgment of an invite request. The invite additional participants component is invoked to send invitations to participants. The add participants subsystem includes a user adds participants component 221, a receive refer component 622, and a receive response to refer component 623. The user adds participants component is invoked when a user wants to add a participant to an established session. The receive refer component is invoked when an endpoint receives a refer request. The receive response to refer request component is invoked to process a response to a refer request. The elect manager subsystem includes an elect roster manager component 631, a decide election component 632, a receive request roster manager component 633, and a receive set roster manager component 634. The elect roster manager component coordinates the election of a roster manager. The decide election component is invoked to decide the results of the election. The receive request roster manager component is invoked to process request roster manager requests. The receive set roster manager component is invoked to process set roster manager requests. The user requests two-party session component is invoked to process a user request to establish a two-party session.

The computing device on which the parallel invitation system is implemented may include a central processing unit, memory, input devices (e.g., keyboard and pointing devices), output devices (e.g., display devices), and storage devices (e.g., disk drives). The memory and storage devices are computer-readable media that may contain instructions that implement the parallel invitation system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the parallel invitation system may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The parallel invitation system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 7:
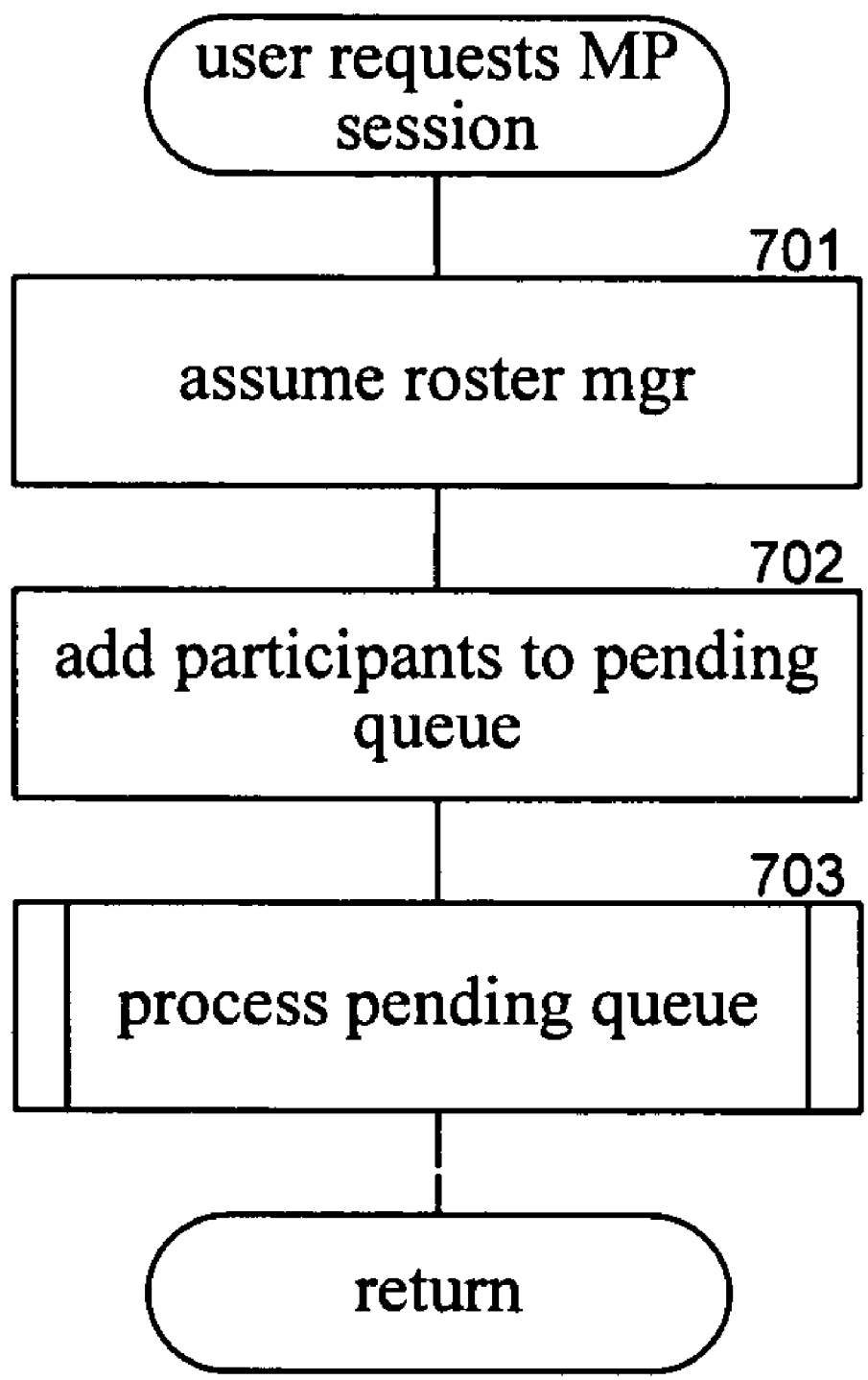
FIG. 7 is a flow diagram illustrating the processing of the user requests multiparty session component in one embodiment.

FIG. 7 is a flow diagram illustrating the processing of the user requests multiparty session component in one embodiment. The component is invoked when a user wants to initiate a multiparty session. The component is passed the identification of the participants that are to be invited. In block 701, the component assumes the role of roster manager. In block 702, the component adds the identification of the participants to the pending queue. In block 703, the component invokes the process pending queue component to send invitations to the participants in the pending queue. The component then returns.

Figure 8:
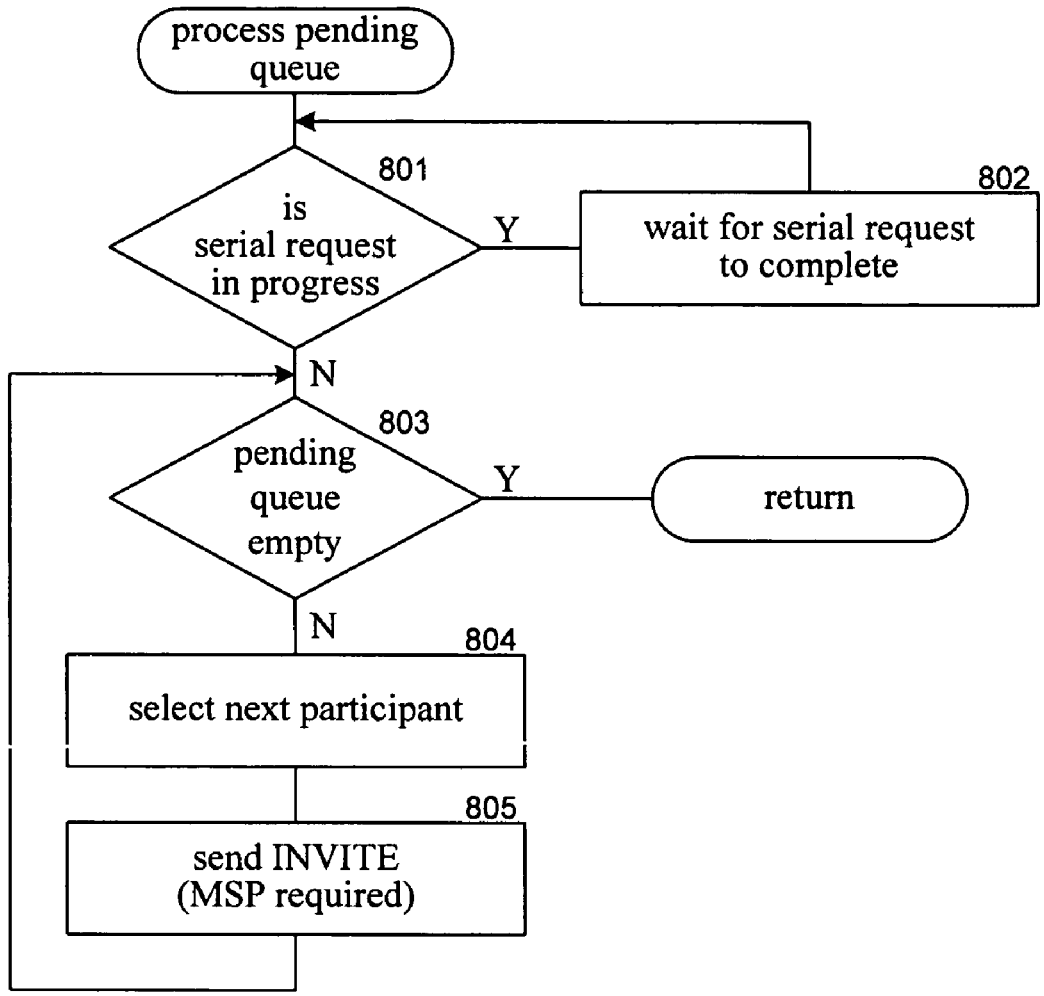
FIG. 8 is a flow diagram that illustrates the processing of the process pending queue component in one embodiment.

FIG. 8 is a flow diagram that illustrates the processing of the process pending queue component in one embodiment. The component sends invitations to the participants in the pending queue. In decision block 801, if there is a serial request in progress, then the component needs to wait until it completes and the component continues at block 802, else the component continues at block 803. In block 802, the component waits for the serial request to complete and then loops to block 801 to continue the processing. In blocks 803-805, the component loops sending invitations indicating the parallel invitation protocol to the participants identified in the pending queue. In decision block 803, if the pending queue is empty, then the component returns, else the component continues at block 804. In block 804, the component selects and removes the next participant from the pending queue. In block 805, the component sends an invite request to the endpoint of the selected participant indicating that the parallel invitation protocol is required. The component may identify all the current, pending and possible participants in the invite request. The component then loops to block 803 to process the next participant in the pending queue.

Figure 9:
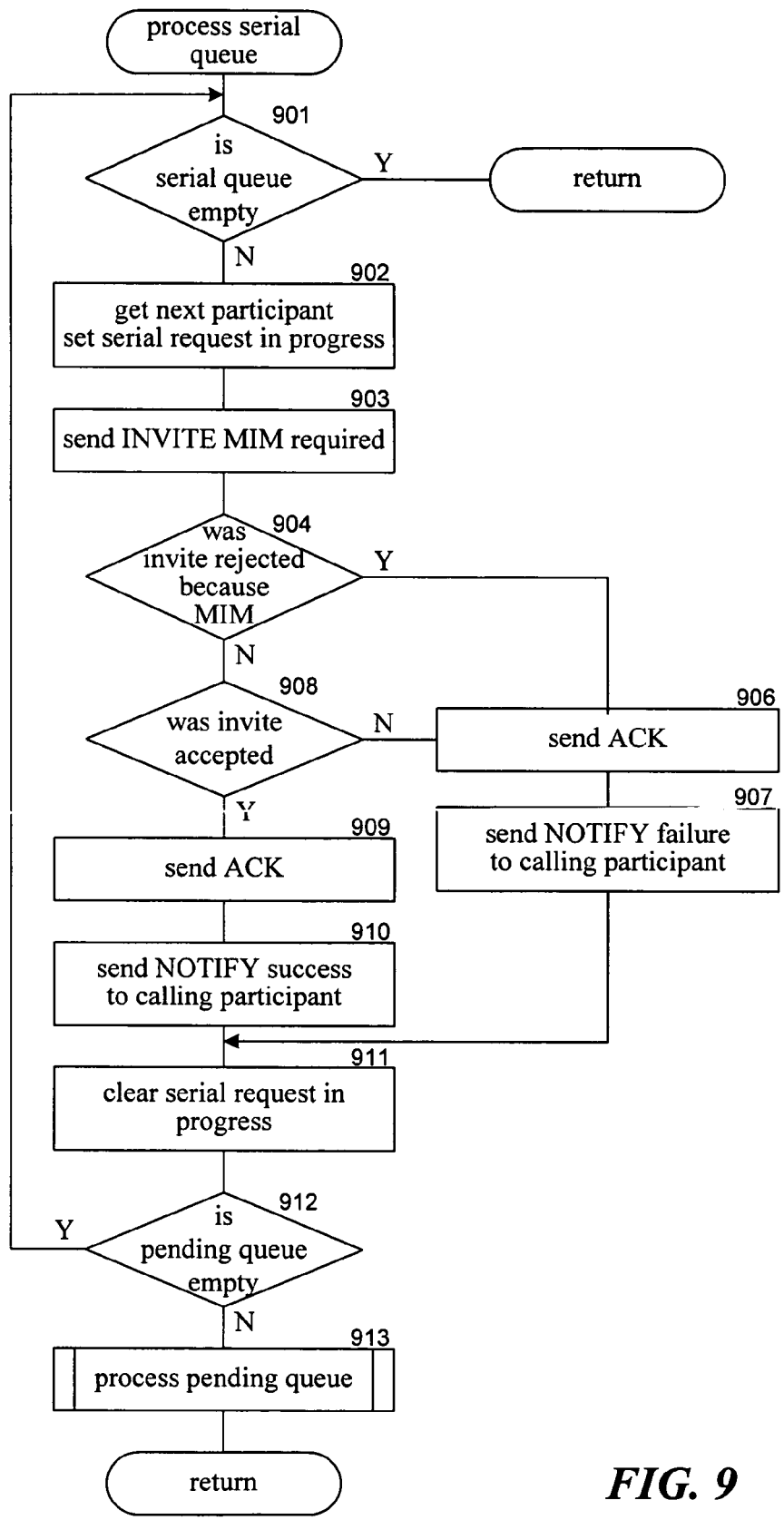
FIG. 9 is a flow diagram that illustrates the processing of the process serial queue component in one embodiment.

FIG. 9 is a flow diagram that illustrates the processing of the process serial queue component in one embodiment. The component is invoked to send invitations serially to the participants in the serial queue. In decision block 901, if the serial queue is empty, then the component returns, else the component continues at block 902. In block 902, the component selects and removes the next participant from the serial queue. The component also sets the serial request in progress flag so that another request (e.g., parallel request) will not be sent until the serial request completes. In block 903, the component sends an invite request to the endpoint of the selected participant indicating that the serial invitation protocol is required. In decision block 904, if the invitation was rejected because the endpoint of the selected participant does not support the serial invitation protocol, then the component continues at block 906, else the component continues at block 908. In block 906, the component sends an acknowledgment to the endpoint of the selected participant. In block 907, the component sends a notify request indicating failure to the referring endpoint if appropriate. In decision block 908, if the invitation was accepted, then the component continues at block 909, else the component continues at block 906. In block 909, the component sends an acknowledgment to the endpoint of the selected participant. In block 910, the component sends a notify request indicating success to the referring endpoint if appropriate. In block 911, the component clears the serial request in process flag to indicate that a serial request is no longer in process. In decision block 912, if the pending queue is empty, then the component loops to block 901, else the component continues at block 913. In block 913, the component invokes the process pending queue component, which effectively gives priority to inviting endpoints that support the parallel invitation protocol so they are not delayed by the endpoints that support only the serial invitation protocol, and then returns.

Figure 10:
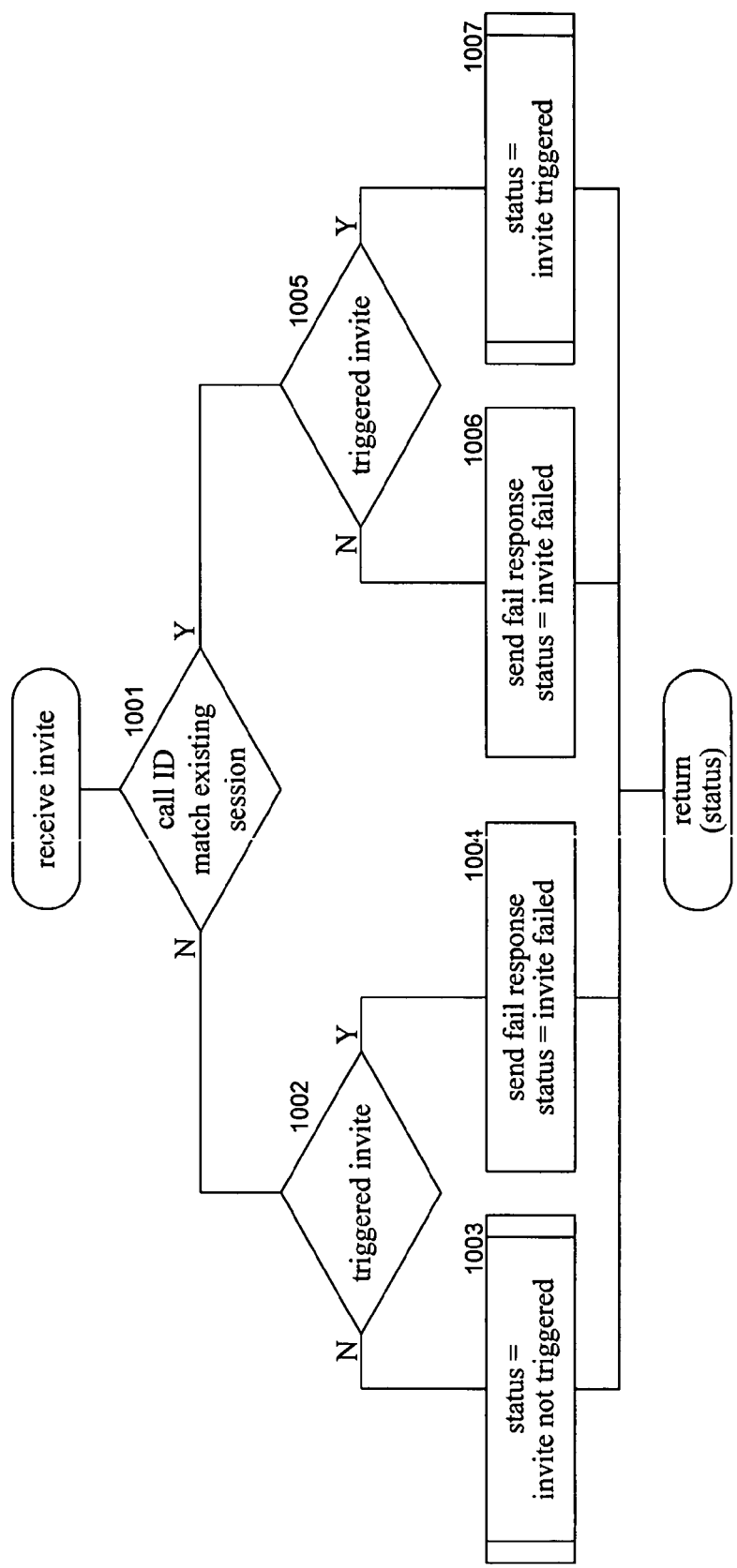
FIG. 10 is a flow diagram that illustrates the processing of the receive invite component in one embodiment.

FIG. 10 is a flow diagram that illustrates the processing of the receive invite component in one embodiment. The component is invoked when an invite request is received. In decision block 1001, if the call identifier of the request matches an existing session of the endpoint, then the component continues at block 1005, else the component continues at block 1002. In block 1002, if the invite request is a triggered invite, then the component continues at block 1004, else the component continues at block 1003. In block 1003, the component invokes the invite component to process the invite request and then returns the status. In block 1004, the component sends a fail response to the inviting endpoint, sets the status to failed, and then returns. In decision block 1005, if the invite request is a triggered invite, then the component continues at block 1007, else the component continues at block 1006. In block 1006, the component sends a fail response to the inviting endpoint, sets the status to failed, and then returns the status. In block 1007, the component invokes the triggered invite component and then returns the status.

Figure 11:
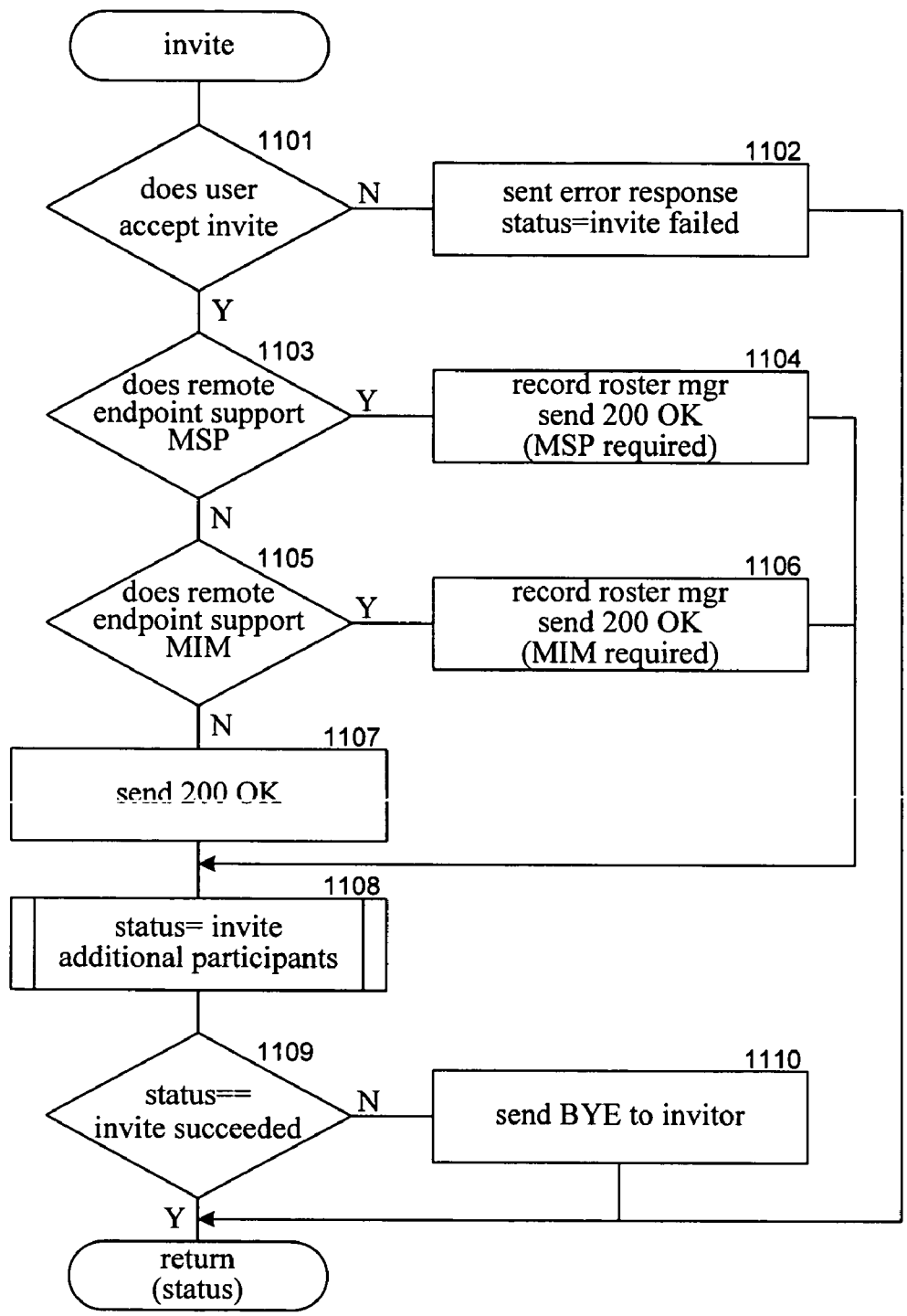
FIG. 11 is a flow diagram that illustrates the processing of the invite component in one embodiment.

FIG. 11 is a flow diagram that illustrates the processing of the invite component in one embodiment. The component is invoked when the endpoint receives an invite request that is not triggered. The component determines whether to accept the request and then sends triggered invite requests to the other participants of the session. In decision block 1101, if the user accepts the invite request, then the component continues at block 1102, else the component continues at block 1103. In block 1102, the component sends an error response to the inviting endpoint, sets the status to failed, and then returns. In decision block 1103, if the inviting endpoint supports the parallel invitation protocol, then the component continues at block 1104, else the component continues at block 1105. In block 1104, the component records the roster manager from the invite request, sends a 200 OK response indicating that the parallel invitation protocol is required, and then continues at block 1108. In decision block 1105, if the inviting endpoint supports the serial invitation protocol, then the component continues at block 1106, else the component continues at block 1107. In block 1106, the component records the roster manager from the invite request, sends a 200 OK response indicating that the serial invitation protocol is required, and then continues at block 1108. In block 1107, the component sends a 200 OK response to the inviting endpoint. In block 1108, the component invokes the invite additional participants component to send triggered invites to the other endpoints of the session that were identified in the invite request. In decision block 1109, if the invitation succeeded, then the component returns a success status, else the component continues at block 1110. In block 1110, the component sends a bye response to the inviting endpoint and then returns a failed status.

Figure 12:
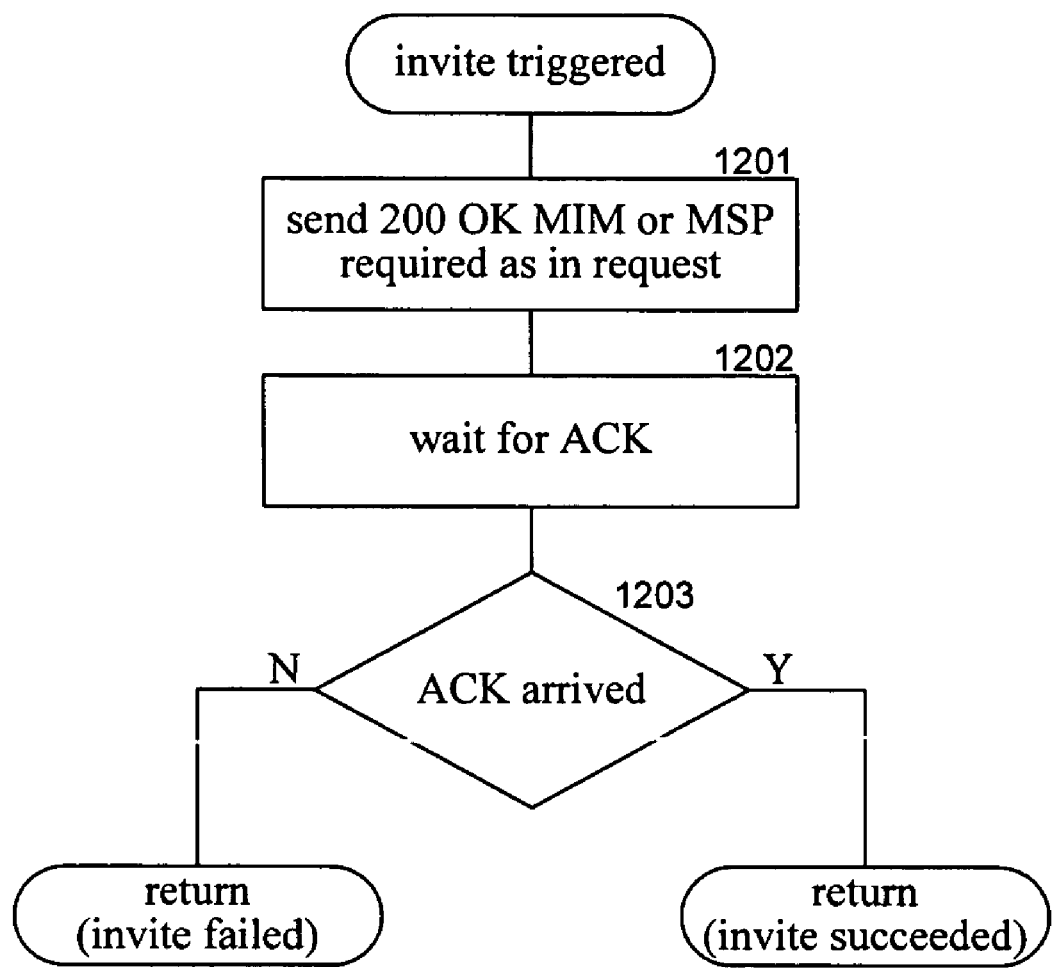
FIG. 12 is a flow diagram that illustrates the processing of the triggered invite component in one embodiment.

FIG. 12 is a flow diagram that illustrates the processing of the triggered invite component in one embodiment. The component is invoked when the endpoint receives an invite request that is triggered. The component automatically accepts the invitation. In block 1201, the component sends a 200 OK response indicating that the serial or parallel invitation protocol is required as indicated in the invite request. In block 1202, the component waits for the acknowledgment. In decision block 1203, if the acknowledgement arrives, then the component returns an indication that the invite succeeded, else the component returns an indication that the invite failed.

Figure 13:
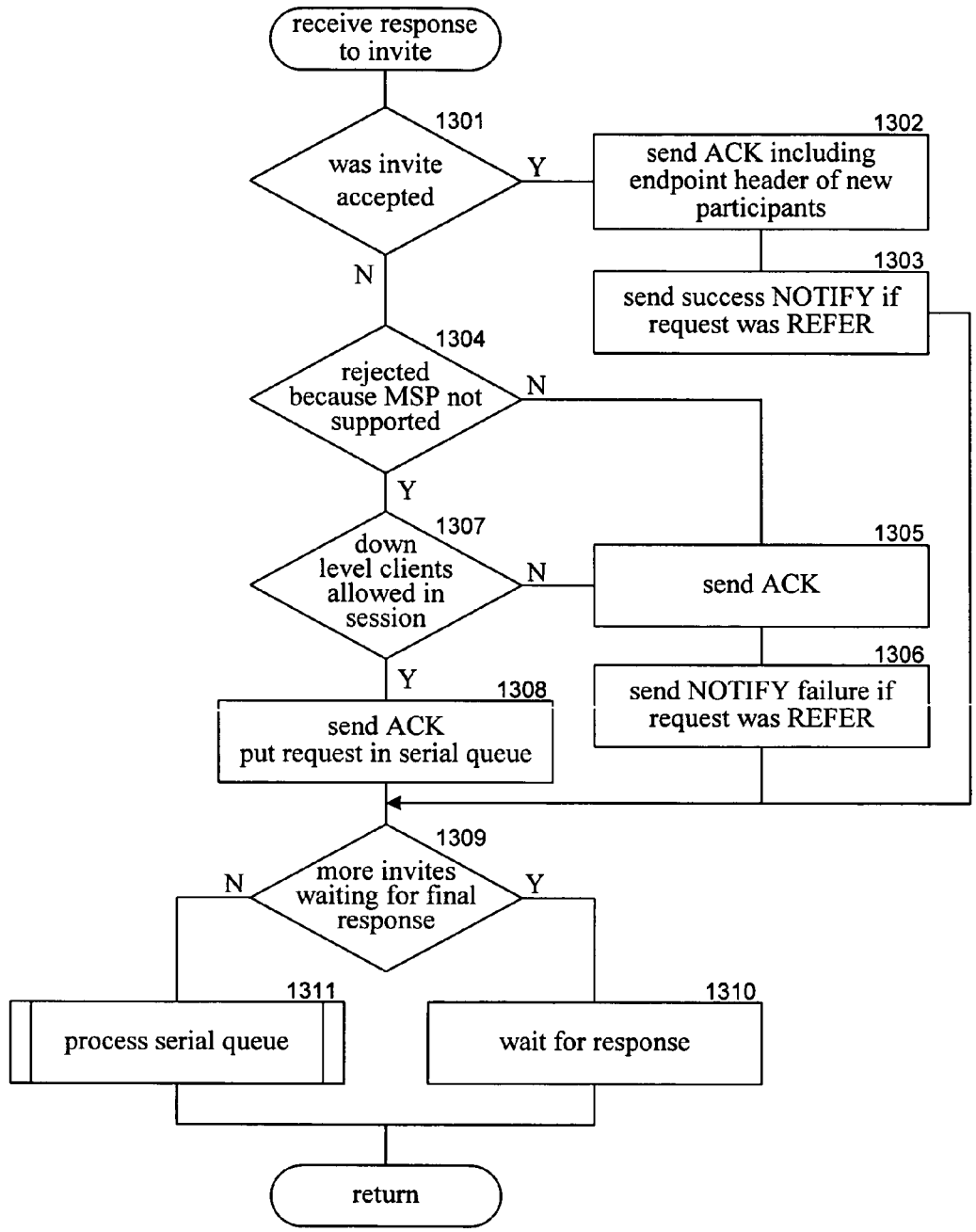
FIG. 13 is a flow diagram that illustrates the processing of the receive response to invite component in one embodiment.

FIG. 13 is a flow diagram that illustrates the processing of the receive response to invite component in one embodiment. The component is invoked when an endpoint receives a response to an invite request. In decision block 1301, if the invite request was accepted, then the component continues at block 1302, else the component continues at block 1304. In block 1302, the component sends an acknowledgment to the invited endpoint that identifies the participants of the session or alternatively only the participants that have joined since the corresponding invite request was sent. In block 1303, the component sends a notify request to a referring endpoint indicating success when the invite request was sent in response to a referral. The component then continues at block 1309. In decision block 1304, if the invitation was rejected because parallel invitation protocol is not supported by the invited endpoint, then the component continues at block 1305, else the component continues at block 1307. In block 1305, the component sends an acknowledgment to the invited endpoint. In block 1306, the component sends a notify request indicating failure to the referring endpoint when the invite request was sent in response to a referral. In decision block 1307, if endpoints that support only the serial invitation protocol are allowed in the session, then the component continues at block 1308, else the component continues at block 1305. In block 1308, the component sends an acknowledgment to the invited endpoint and adds the participants of the invited endpoint to the serial queue. In decision block 1309, if more invite requests are waiting for a final response, then the component continues at block 1310, else the component continues at block 1311. In block 1310, the component waits for the responses and then returns. In block 1311, the component invokes the process serial queue component and then returns.

Figure 14:
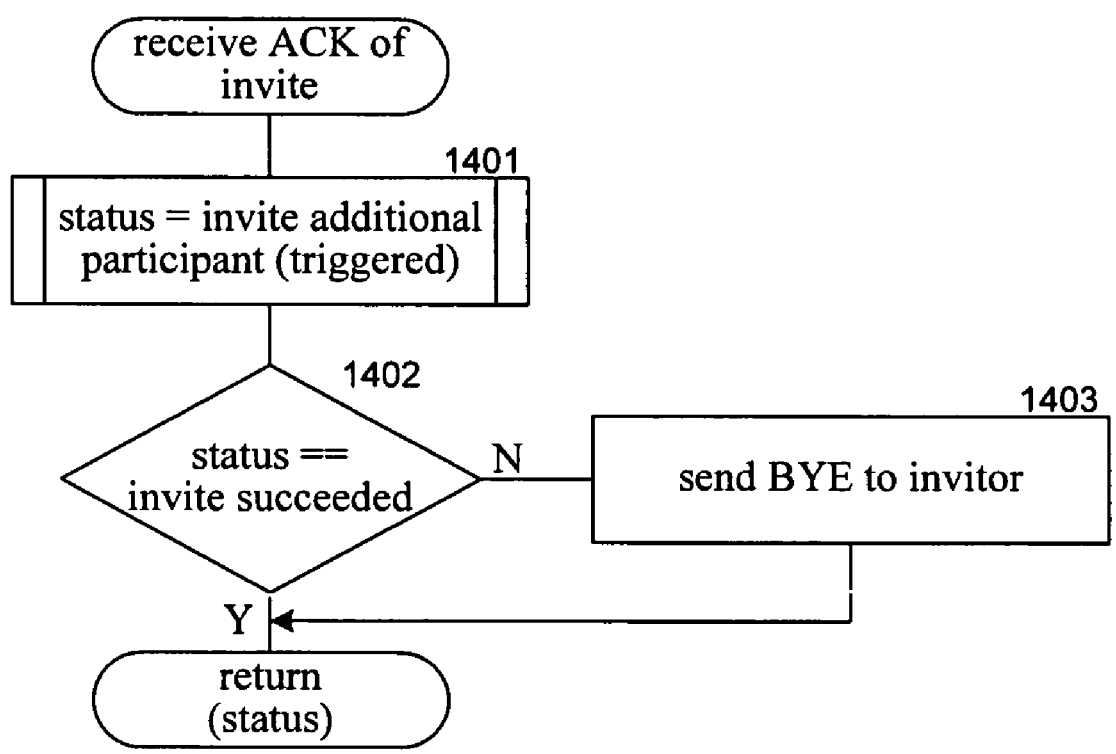
FIG. 14 is a flow diagram that illustrates the processing of the receive acknowledgment of invite component in one embodiment.

FIG. 14 is a flow diagram that illustrates the processing of the receive acknowledgment of invite component in one embodiment. The component is invoked when an invited endpoint receives an acknowledgment for the invite request. In block 1401, the component invokes the invite additional participants component passing an indication that the invite requests are to be triggered. In decision block 1402, if the invite succeeded, then the component returns a succeeded status, else the component continues at block 1403. In block 1403, the component sends a bye request to the inviting endpoint and then returns a failure status.

Figure 15:
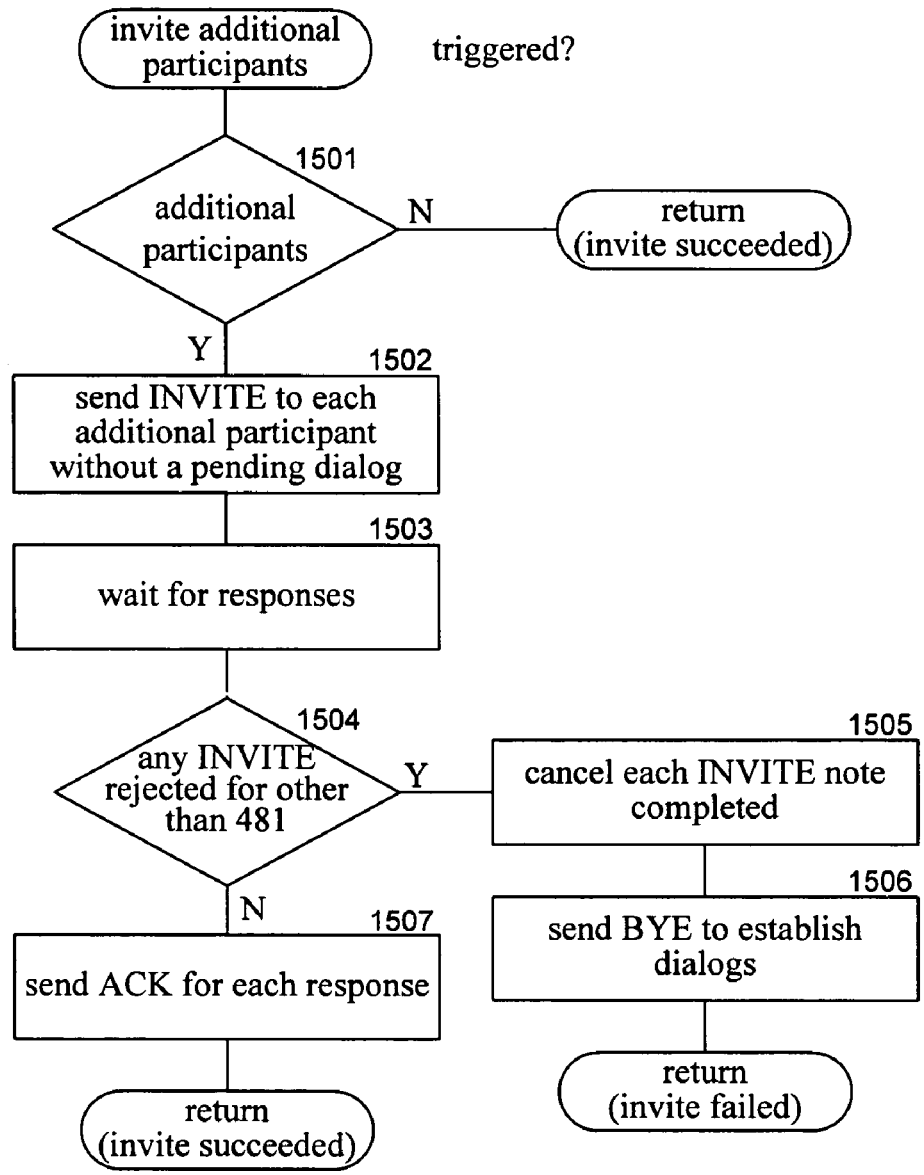
FIG. 15 is a flow diagram that illustrates the processing of the invite additional participants component in one embodiment.

FIG. 15 is a flow diagram that illustrates the processing of the invite additional participants component in one embodiment. The component is passed an indication as to whether the invite request should be triggered. In decision block 1501, if there are additional participants to be invited, then the component continues at block 1502, else the component returns with a status that the invite succeeded. In block 1502, the component sends an invite request to each additional participant for which there is no pending dialog. The invite request indicates whether the invite is triggered or not as indicated by the passed parameter. In block 1503, the component waits for the responses from the invited endpoints. In decision block 1504, if an invited endpoint rejected the invite request with a response other than a 481, then the component continues at block 1505, else the component continues at block 1507. In block 1505, the component cancels each invite request that has not been completed. In block 1506, the component sends a bye request to the endpoints with which a dialog is established. The component then returns an invite failed status. In block 1507, the component sends an acknowledgment to each endpoint that responded. The component then returns an invite succeeded status.

Figure 16:
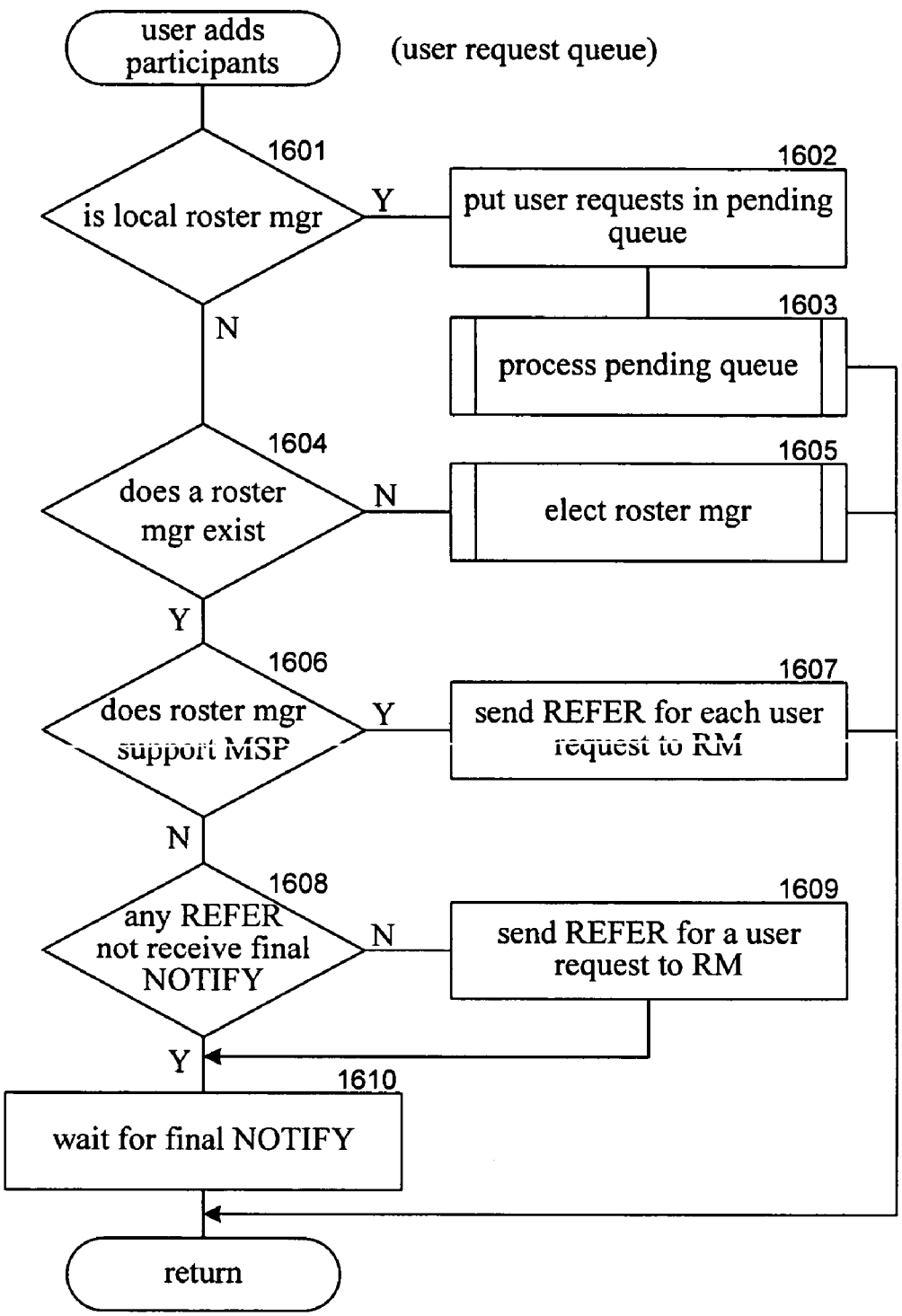
FIG. 16 is a flow diagram that illustrates the processing of the user adds participants component in one embodiment.

FIG. 16 is a flow diagram that illustrates the processing of the user adds participants component in one embodiment. The component is invoked when a user wants to add additional participants to an established session. The component is passed a user queue of the participants to be added. In decision block 1601, if the local endpoint is the roster manager, then the component continues at block 1602, else the component continues at block 1604. In block 1602, the component puts the identification of the participants of the user queue onto the pending queue. In block 1603, the component invokes the process pending queue component to effect the inviting of the participants to the established session and then returns. In decision block 1604, if a roster manager exists, then the component continues at block 1606, else the component continues at block 1605. In block 1605, the component invokes the elect roster manager component and then returns. In decision block 1606, if the roster manager supports the parallel invitation protocol, then the component continues at block 1607, else the component continues at block 1608. In block 1607, the component sends to the roster manager a refer request for each participant to be added and then returns. In decision block 1608, if a refer request does not receive a final notify, then the referral failed and the component continues at block 1610, else the component continues at block 1609. In block 1609, the component sends a refer request to the roster manager indicating a participant of the user request queue. In block 1610, the component waits for the final notify of the notify requests and then returns.

Figure 17:
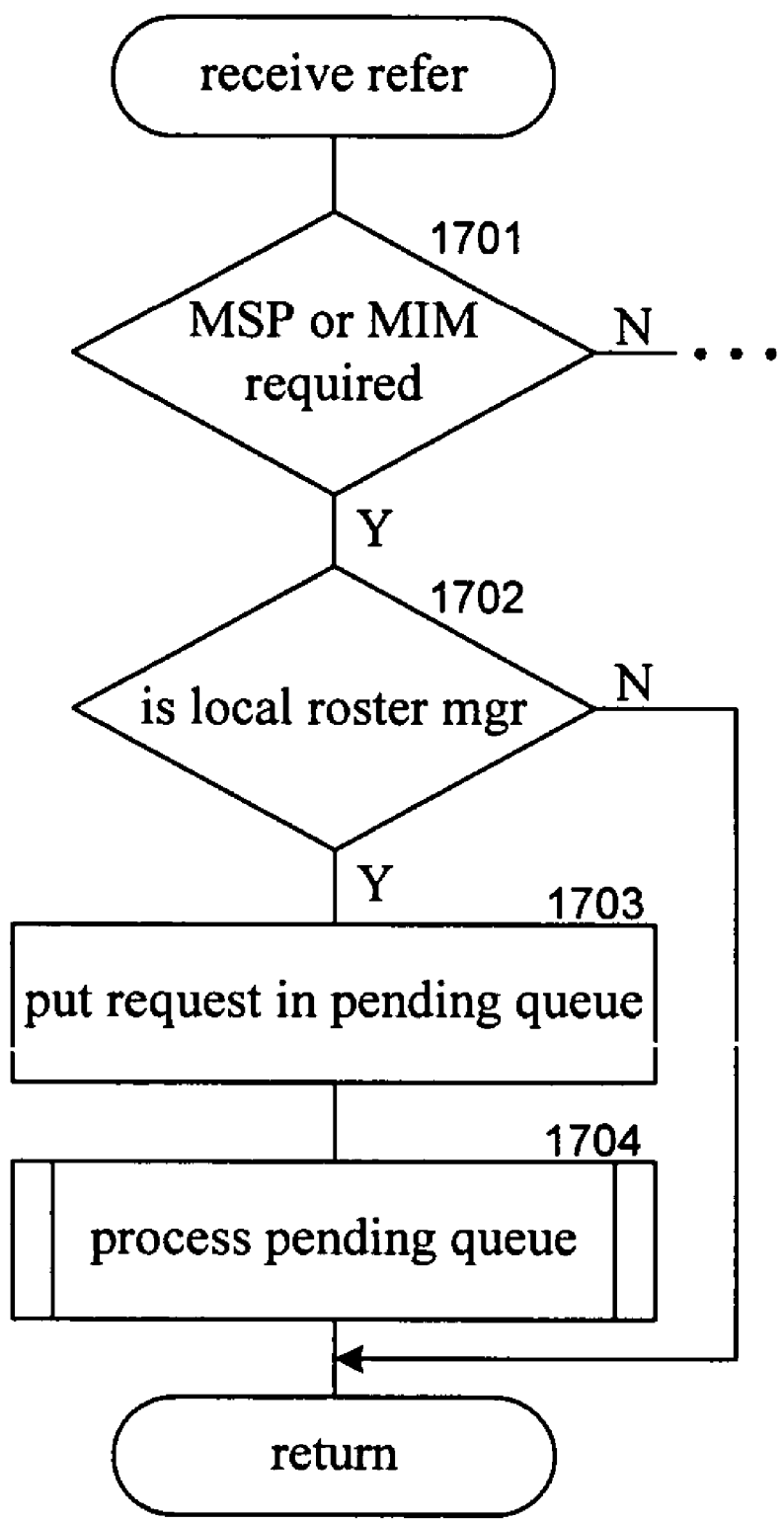
FIG. 17 is a flow diagram that illustrates the processing of the receive refer component in one embodiment. The component is invoked when an endpoint receives a refer request.

FIG. 17 is a flow diagram that illustrates the processing of the receive refer component in one embodiment. The component is invoked when an endpoint receives a refer request. In decision block 1701, if the serial or parallel invitation protocol is required, then the component continues at block 1702. In decision block 1702, if the local endpoint is the roster manager, then the component continues at block 1703, else the component returns. In block 1703, the component puts the identification of the participant indicated in the refer request onto the pending queue. In block 1704, the component invokes the process pending queue component and then returns.

Figure 18:
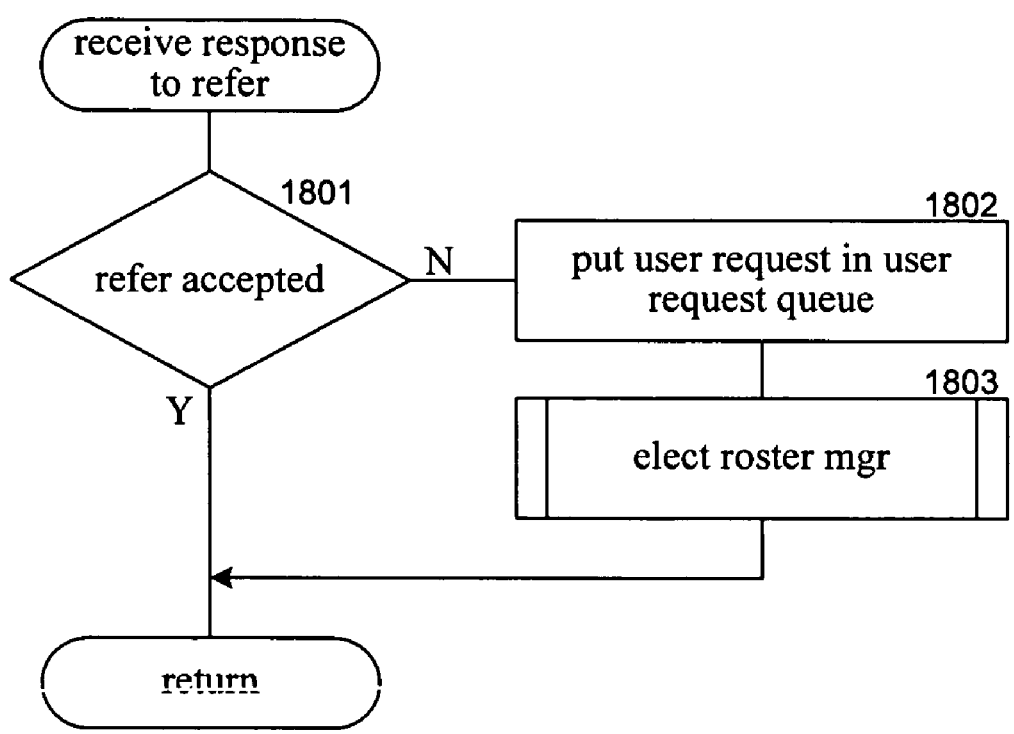
FIG. 18 is a flow diagram that illustrates the processing of the receive response to refer component in one embodiment.

FIG. 18 is a flow diagram that illustrates the processing of the receive response to refer component in one embodiment. The component is invoked when an endpoint that sent a refer request receives a response. In decision block 1801; if the refer request was accepted, then the component returns, else the component continues at block 1802. In block 1802, the component puts the identification of the participant in the local user request queue to try again and then continues at block 1803. In block 1803, the component invokes the elect roster manager component and then returns.

Figure 19:
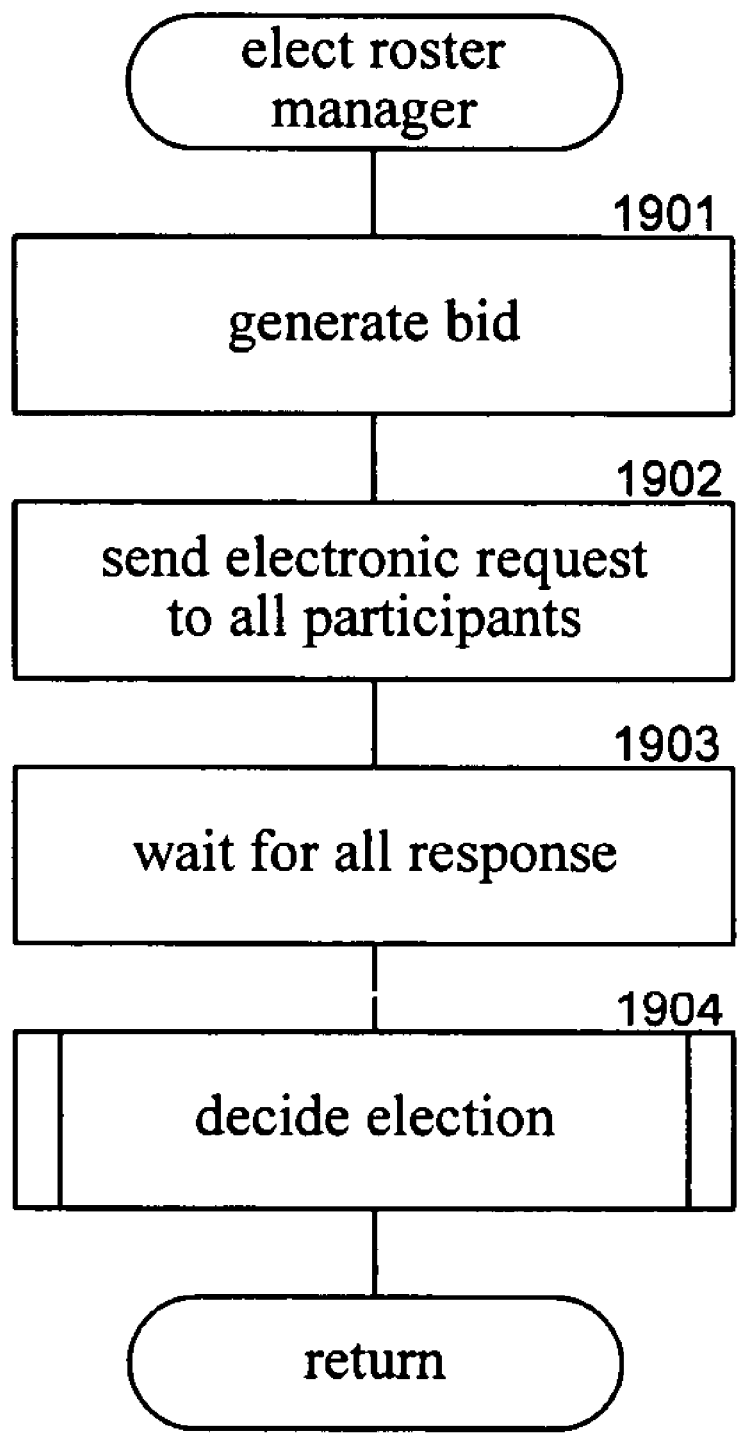
FIG. 19 is a flow diagram that illustrates the processing of the elect roster manager component in one embodiment.

FIG. 19 is a flow diagram that illustrates the processing of the elect roster manager component in one embodiment. The component is invoked when an endpoint decides that a roster manager needs to be elected. In block 1901, the component generates a bid for the election process. The bid may be a random number, a network address, or some other number or combination of numbers that has a high probability of being unique. In block 1902, the component sends an election request to each of the other participants in the session. In block 1903, the component waits for the responses. In block 1904, the component invokes the decide election component and then returns.

Figure 20:
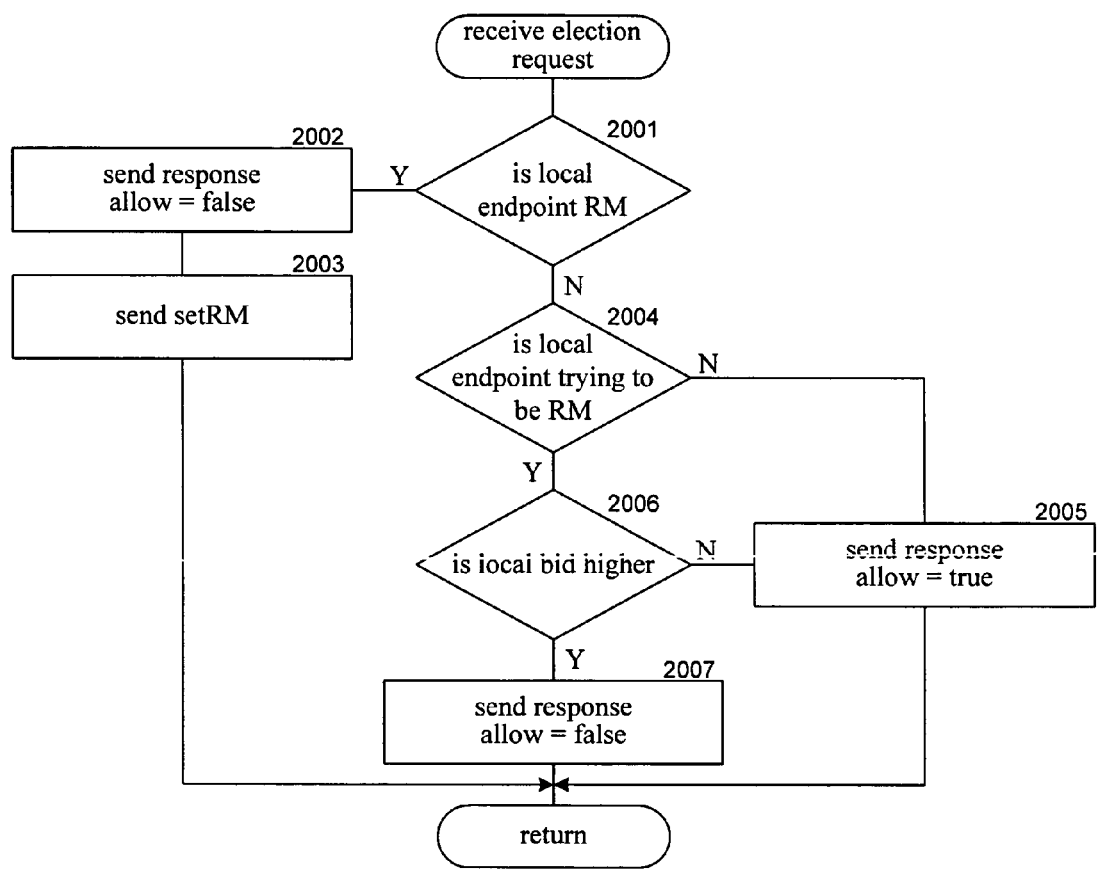
FIG. 20 is a flow diagram that illustrates the processing of the receive election request component in one embodiment.

FIG. 20 is a flow diagram that illustrates the processing of the receive election request component in one embodiment. The component is invoked when an endpoint receives an election request. In decision block 2001, if the local endpoint is the roster manager, then the component continues at block 2002, else the component continues at block 2004. In block 2002, the component sends a response to the candidate endpoint that sent the election request indicating that that endpoint is not allowed to be the roster manager. In block 2003, the component sends a set roster manager request to each other endpoint in the session to notify them of the new roster manager and then returns. In decision block 2004, if the local endpoint is currently trying to be the roster manager, then the component continues at block 2006, else the component continues at block 2005. In block 2005, the component sends a response to the candidate endpoint indicating that that endpoint is allowed to be roster manager. The component then returns. In decision block 2006, if the local bid is higher than the bid of the candidate endpoint, then the component continues at block 2007, else the component continues at block 2005. In block 2007, the component sends a response to the candidate endpoint indicating that the endpoint is not allowed to be the roster manager. The component then returns.

Figure 21:
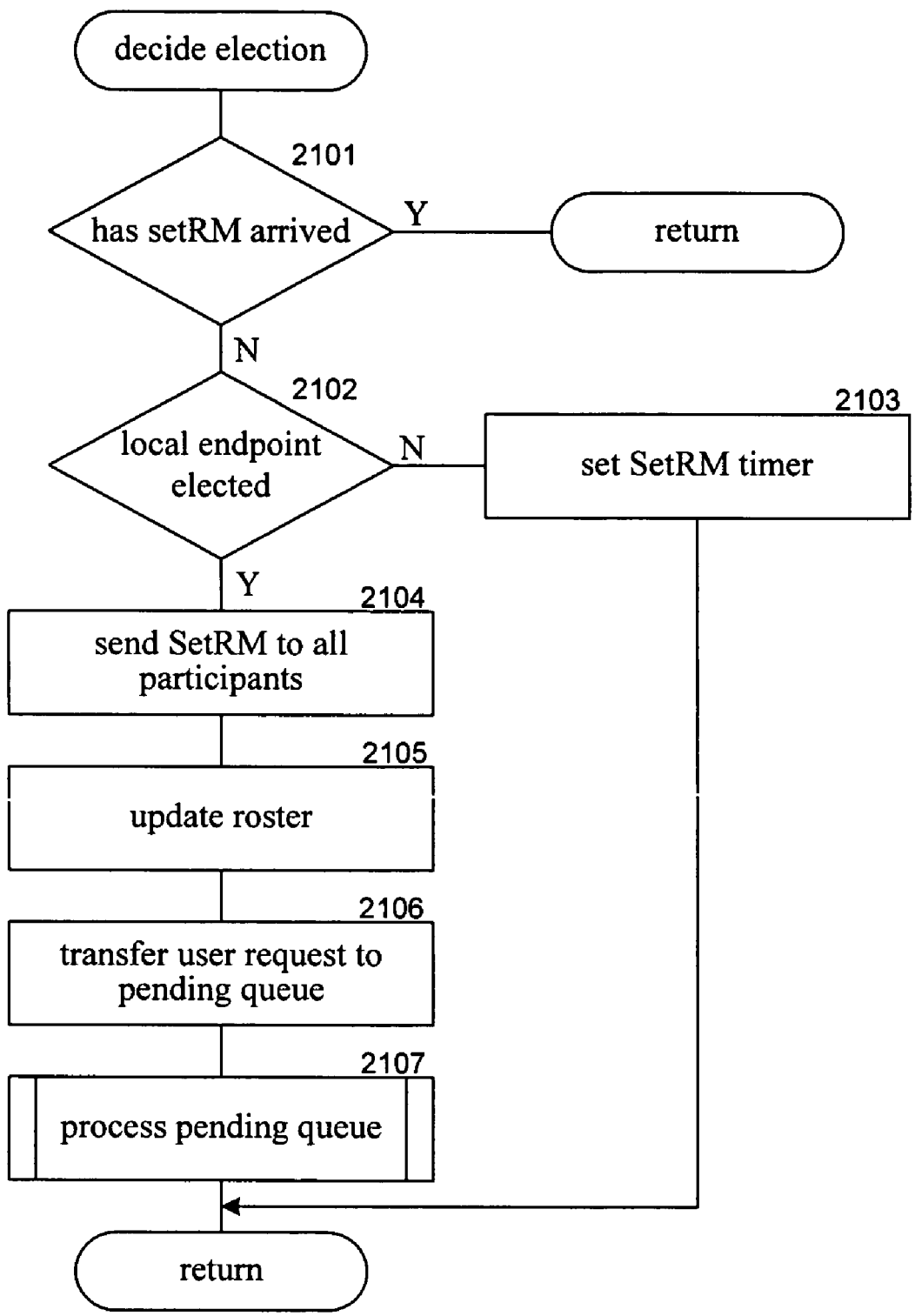
FIG. 21 is a flow diagram that illustrates the processing of the decide election component in one embodiment.

FIG. 21 is a flow diagram that illustrates the processing of the decide election component in one embodiment. The component is invoked when a candidate endpoint receives all the responses to its election requests. In decision block 2101, if a set roster manager request has arrived, then someone else has been elected and the component returns, else the component continues at block 2102. In decision block 2102, if the local endpoint has been elected (i.e., all responses allow the election), then the component continues at block 2104, else the component continues at block 2103. In block 2103, the component sets a set roster manager timer and returns. When the set roster manager timer expires, then the elect roster manager processing is performed again to ensure that an endpoint is eventually elected roster manager. In block 2104, the component sends a set roster manager request to all endpoints of the session. In block 2105, the component updates the roster. In block 2106, the component transfers participants in the user request queue to the pending queue. In block 2107, the component invokes the process pending queue component and then returns.

Figure 22:
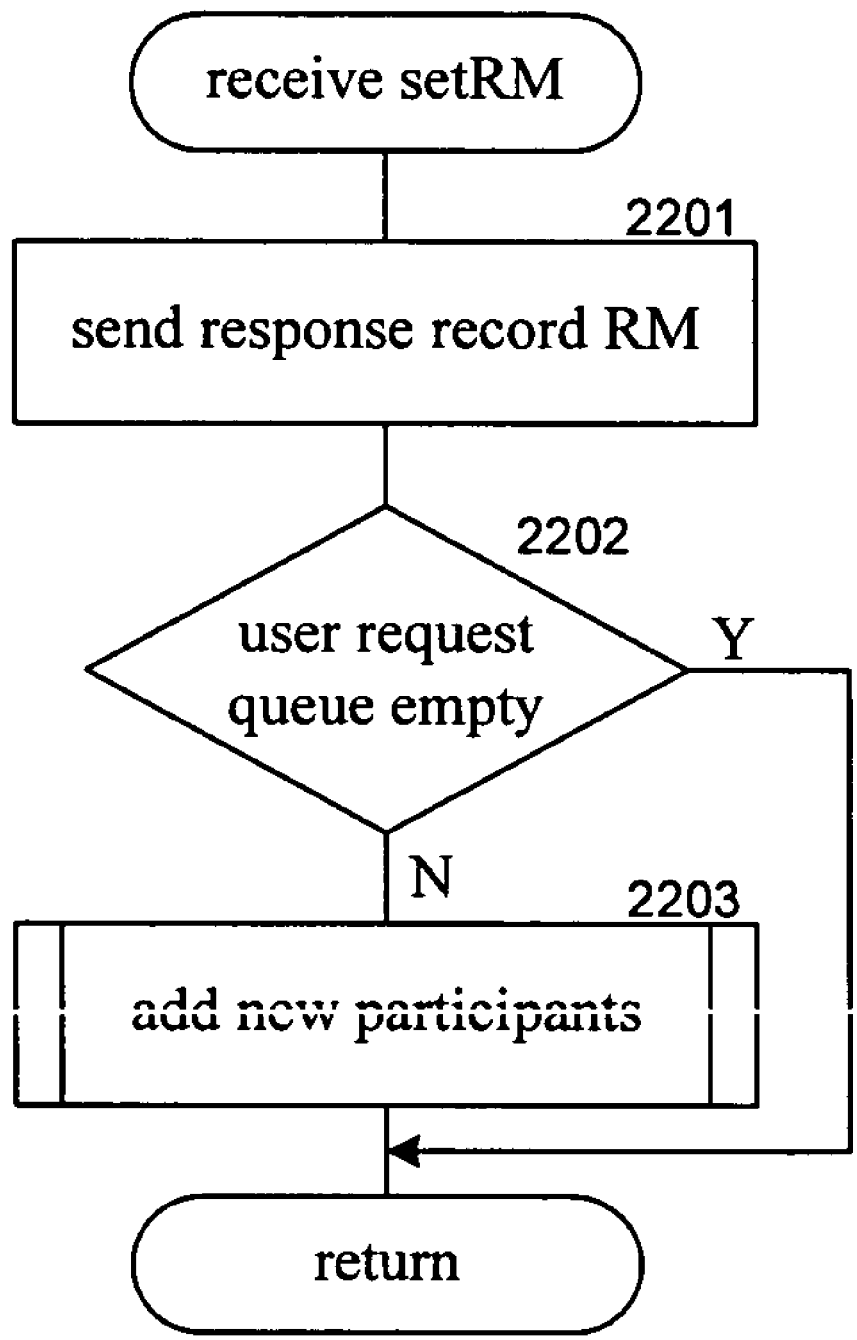
FIG. 22 is a flow diagram that illustrates the processing of the receive set roster manager component in one embodiment.

FIG. 22 is a flow diagram that illustrates the processing of the receive set roster manager component in one embodiment. The component is invoked when an endpoint receives a set roster manager request. In block 2701, the component sends a response to the endpoint that sent the set roster manager request and records the roster manager. In decision block 2202, if the user request queue is empty, then the component returns, else the component continues at block 2203. In block 2203, the component invokes the add new participants component and then returns.

Figure 23:
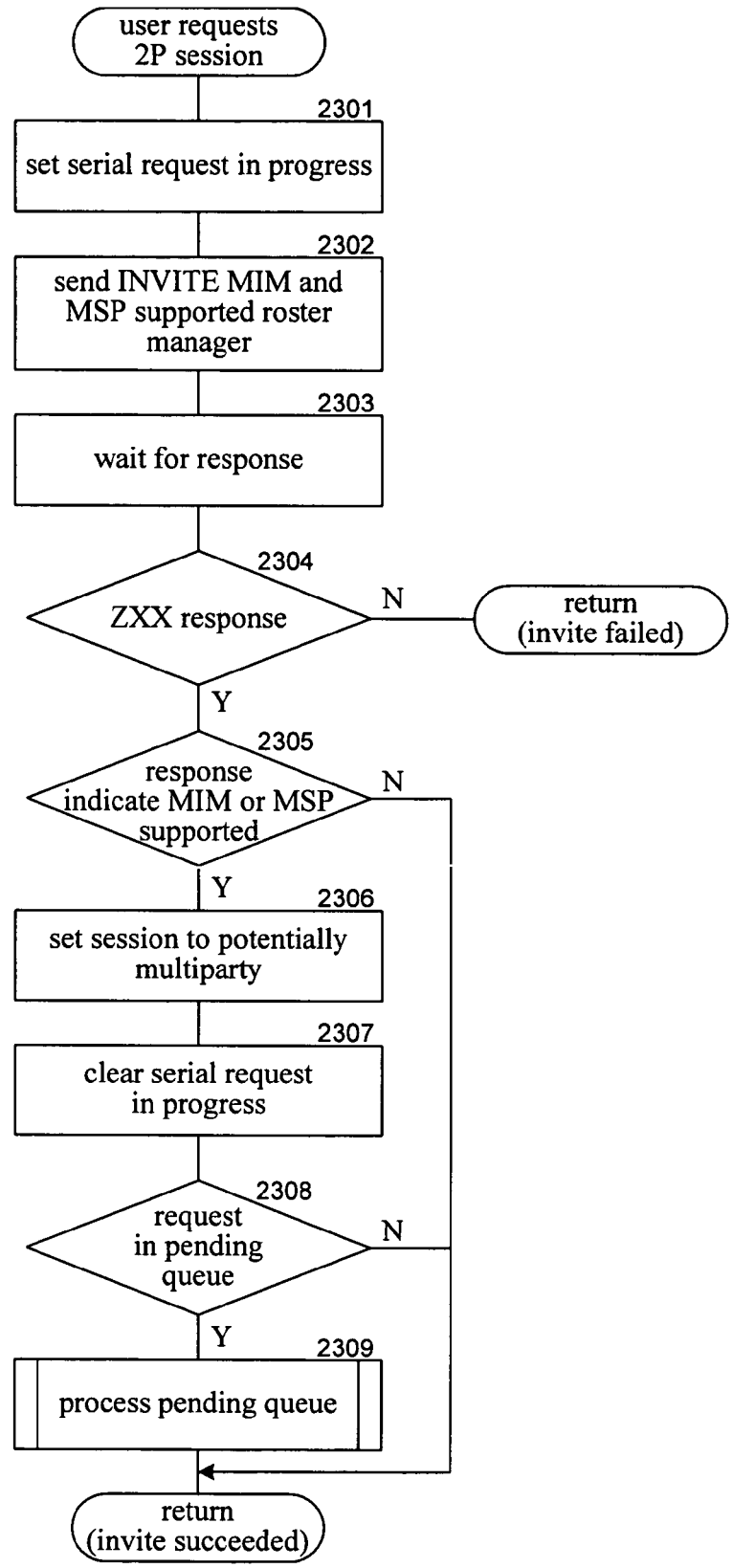
FIG. 23 is a flow diagram that illustrates the processing of the user requests a two-party session component in one embodiment.

FIG. 23 is a flow diagram that illustrates the processing of the user requests a two-party session component in one embodiment. The component is invoked when a user requests a session with one other participant to be established. In block 2301, the component sets the serial request in progress flag. In block 2302, the component sends an invite request indicating that the serial and parallel invitation protocol is supported and that this endpoint is the roster manager. In block 2303, the component waits for a response. In decision block 2304; if a 2XX response is received, then the component continues at block 2305, else an error occurred and the component returns an invite failed status. In decision block 2305, if the response indicates that the serial or parallel invitation protocol is supported, then the component continues at block 2306, else only a two-party session can be supported and the component returns an indication that the invite succeeded. In block 2306, the component sets the session to be potentially multiparty. In block 2307, the component clears the serial request in progress flag. In decision block 2308, if there is a participant in the pending queue, then the component continues at block 2309, else the component returns a status of invite succeeded. In block 2309, the component invokes the process pending queue component and then completes.

From the foregoing, it will be appreciated that specific embodiments of the parallel invitation system have been described herein for purposes of illustration, but that various modifications may be made without deviating from the spirit and scope of the invention. Accordingly, the invention is not limited except as by the appended claims.

We claim:

1. A computer-readable storage device containing instructions that when executed by a computing system having a memory and a processor cause the computing system to perform a method for controlling a first endpoint to join a first session by a method comprising:

receiving from a second endpoint an invitation sent via a parallel invitation protocol to establish a dialog that has not yet been established, wherein the second endpoint is configured to, send invitations via the parallel invitation protocol to a plurality of endpoints, wherein each invitation sent via the parallel invitation protocol includes a first field indicating that the invited endpoint must support the parallel invitation protocol in order to accept the invitation, after receiving the invitation sent via the parallel invitation protocol, sending to the second endpoint an acceptance of the invitation, wherein the second endpoint is further configured to, in response to receiving from one of the plurality of endpoints an acceptance of the invitation sent via the parallel invitation protocol, indicate that the endpoint from which the acceptance was received is now a participating endpoint with which a dialog of the multiparty session has been established, and send to the endpoint from which the acceptance was received an acknowledgement including an indication of participating endpoints with which the second endpoint has already established a dialog of the multiparty session, receiving from the second endpoint acknowledgement indicating other endpoints in the first session, wherein the received acknowledgement includes endpoints in the first session that were not indicated in the received invitation sent via the parallel invitation protocol, and sending to each of the other endpoints in the first session a triggered invitation to establish a dialog of the first session between the first endpoint and the other endpoint, wherein the other endpoints are configured to, in response to receiving the triggered invitation, send to the first endpoint an acceptance of the triggered invitation to establish the dialog of the first session between the first endpoint and the other endpoint.

2. The computer-readable storage device of claim 1 wherein when the first endpoint is a roster-manager of the first session and a new endpoint is to be added to the first session, the first endpoint sends, to the new endpoint, an invitation to establish a dialog between the first endpoint and the new endpoint and sends an indication of the endpoints in the first session to the new endpoint.

3. The computer-readable storage device of claim 1 wherein when the first endpoint is not a roster-manager of the first session and a new endpoint is to be added to the first session, the first endpoint sends to the roster-manager a referral identifying the endpoint to be added.

4. The computer-readable storage device of claim 1 wherein the invitation sent via the parallel invitation protocol identifies endpoints of pending participants.

5. A computer system having a processor and a memory at a first endpoint for establishing a multiparty session that has not yet been established, the computer system comprising:

an invitation component that when the first endpoint is an initiating endpoint for the multiparty session that has not yet been established, sends in parallel to each of a plurality of second endpoints an invitation to establish a dialog of the multiparty session, wherein each invitation sent in parallel includes a first field indicating that a second endpoint must support a parallel invitation protocol in order to accept the invitation and a second field indicating that the first endpoint is a roster-manager of the multiparty session, and in response to receiving from a second endpoint an acceptance of the invitation to establish the dialog of the multiparty session, indicates that the second endpoint is now a participating endpoint with which a dialog of the multiparty session has been established, and sends to the second endpoint an acknowledgement including an indication of participating endpoints with which a dialog of the multiparty session has already been established between the initiating endpoint and the participating endpoint; and an acceptance component that when the first endpoint is not an initiating endpoint, receives from the initiating endpoint of the multiparty session an invitation to establish a dialog of the multiparty session with the initiating endpoint of the multiparty session, sends to the initiating endpoint an acceptance, receives from the initiating endpoint an acknowledgement indicating participating endpoints in the multiparty session so that the first endpoint can establish dialogs with the participating endpoints in the multiparty session, wherein the acknowledgement indicates endpoints in the first session that were not indicated in the received invitation, and sends a triggered invite to each of the participating endpoints in the multiparty session for which a dialog of the multiparty session has not already been established between the first endpoint and the participating endpoint, the triggered invite being an invitation to establish a dialog of the multiparty session between the first endpoint and a participating endpoint, and when the first endpoint receives from a participating endpoint a triggered invite to establish a dialog of the multiparty session between the first endpoint and the participating endpoint, sends to the participating endpoint an acceptance to establish the dialog of the multiparty session between the first endpoint and the participating endpoint; and a component that, in response to determining that a roster-manager has left the multiparty session, sends to other endpoints in the multiparty session a request that the first endpoint be the roster-manager of the multiparty session wherein the components are stored as instructions in the memory for execution by the processor.

6. The computer system of claim 5 wherein the acceptance component sends an acceptance automatically when the endpoint is in the multiparty session and sends an acceptance after a participant indication when the endpoint is not in the multiparty session.

7. The computer system of claim 5 including a component to elect a roster-manager of the multiparty session that is responsible for sending invitations to endpoints not in the multiparty session.

8. The computer-readable storage device of claim 1, further comprising:

electing a roster-manager of the first session that is responsible for sending invitations to endpoints not in the first session.

9. A method, performed by a first endpoint having a memory and a processor, comprising:

in response to receiving a request to initiate a first session, sending invitations via a parallel invitation protocol to a plurality of endpoints, wherein each invitation sent via the parallel invitation protocol includes a first field indicating that the invited endpoint must support the parallel invitation protocol in order to accept the invitation, and in response to receiving, from one of the plurality of endpoints, an acceptance of the invitation sent via the parallel invitation protocol,
- indicating that the endpoint from which the acceptance was received is now a participating endpoint with which a dialog of the first session has been established, and
- sending to the endpoint from which the acceptance was received an acknowledgement including an indication of participating endpoints with which the first endpoint has already established a dialog of the first session; and in response to receiving from a second endpoint an invitation sent via a-the parallel invitation protocol to establish a dialog of a second session,
- with a processor, sending to the second endpoint an acceptance of the received invitations,
- receiving from the second endpoint an indication of the other endpoints in the second session, wherein the received indication includes endpoints in the second session that were not indicated in the received invitation sent via the parallel invitation protocol, and
- sending to each of the other endpoints in the second session a triggered invitation to establish a dialog of the second session between the first endpoint and the other endpoint, wherein the other endpoints are configured to, in response to receiving the triggered invitation, send to the first endpoint an acceptance of the triggered invitation to establish the dialog of the second session between the first endpoint and the other endpoint.

10. The method of claim 9 wherein when the first endpoint is a roster-manager of the first session and a new endpoint is to be added to the first session, the first endpoint sends, to the new endpoint, an invitation to establish a dialog between the first endpoint and the new endpoint and sends an indication of the endpoints in the first session to the new endpoint.

11. The method of claim 9 wherein when the first endpoint is not a roster-manager of the second session and a new endpoint is to be added to the second session, the first endpoint sends to the roster-manager a referral identifying the endpoint to be added.

12. The method of claim 9 wherein the invitation sent via the parallel invitation protocol identifies endpoints of pending participants.

13. The method of claim 9, further comprising: electing a roster-manager of the first session that is responsible for sending invitations to endpoints not in the first session.

* * * * *

UNITED STATES PATENT AND TRADEMARK OFFICE
CERTIFICATE OF CORRECTION

PATENT NO. : 7,882,176 B2
APPLICATION NO. : 11/140472
DATED : February 1, 2011
INVENTOR(S) : Paul D. Tidwell et al.

Page 1 of 1

It is certified that error appears in the above-identified patent and that said Letters Patent is hereby corrected as shown below:

In column 10, line 25, after "does" insert -- not support the parallel invitation protocol, to join the session. Endpoint B, however, is not --.

In column 23, line 17, in Claim 9, after "sent via" delete "a-".

Signed and Sealed this
Nineteenth Day of July, 2011

David J. Kappos
*Director of the United States Patent and Trademark Office*